United States Patent [19]

Acton et al.

[11] Patent Number: 5,005,353
[45] Date of Patent: Apr. 9, 1991

[54] ACTIVE CONTROL OF UNSTEADY MOTION PHENOMENA IN TURBOMACHINERY

[75] Inventors: Elizabeth Acton, Cambridge; Alexander M. Cargill, Derby; Colin F. Ross; Graham P. Eatwell, both of Cambridge, all of England

[73] Assignee: Rolls-Royce plc, London, England

[21] Appl. No.: 511,726

[22] Filed: Apr. 20, 1990

Related U.S. Application Data

[60] Division of Ser. No. 187,169, Apr. 28, 1988, Pat. No. 4,967,550, which is a continuation-in-part of Ser. No. 36,770, Apr. 9, 1987, abandoned.

[30] Foreign Application Priority Data

Apr. 28, 1986 [GB] United Kingdom ............... 8610297
Apr. 28, 1987 [GB] United Kingdom ............... 8710071

[51] Int. Cl.$^5$ .................. F02C 7/057; F04D 27/02
[52] U.S. Cl. ...................... 60/39.281; 60/39.29; 415/27; 415/119
[58] Field of Search .............. 60/39.281, 39.29; 415/26, 27, 28, 119

[56] References Cited

U.S. PATENT DOCUMENTS

| | | | |
|---|---|---|---|
| 2,926,524 | 2/1960 | Sanders | 60/39.29 |
| 3,002,349 | 10/1961 | Arnett et al. | 60/39.281 |
| 3,006,144 | 10/1961 | Arnett et al. | 60/39.281 |
| 3,245,219 | 4/1966 | Warden et al. | 60/39.29 |
| 3,936,606 | 2/1976 | Wanke | 415/119 |
| 4,255,083 | 3/1981 | Andre et al. | 415/119 |
| 4,557,106 | 12/1985 | Williams et al. | 60/39.281 |

FOREIGN PATENT DOCUMENTS 1428023 4/1989 Fed. Rep. of Germany ...... 415/119

Primary Examiner—Louis J. Casaregola
Attorney, Agent, or Firm—Cushman, Darby & Cushman

[57] ABSTRACT

A control system actively controls at least one troublesome mode of an unsteady motion phenomenon in turbomachinery in order to enable an increase in the operating range of the turbomachinery. For example, rotor blade flutter or rotating stall may be controlled in a turbocompressor. The control system has a control bandwidth which is at least partly coextensive with the bandwidth of the unsteady motion phenomenon and operates by passing sensor signals related to the unsteady motion phenomenon from a sensor array in the turbomachine to a mode filter which produces a signal or signals which are related to the troublesome mode or modes. The selected mode signals are amplified and phase-shifted by time-variable amounts so as to produce control signals having controlled amplitude and phase relationship to the troublesome mode. Actuators in an actuator array are continuously driven by the control signals and produce physical effects in the turbomachine which act counter to the troublesome mode without exciting others.

16 Claims, 8 Drawing Sheets

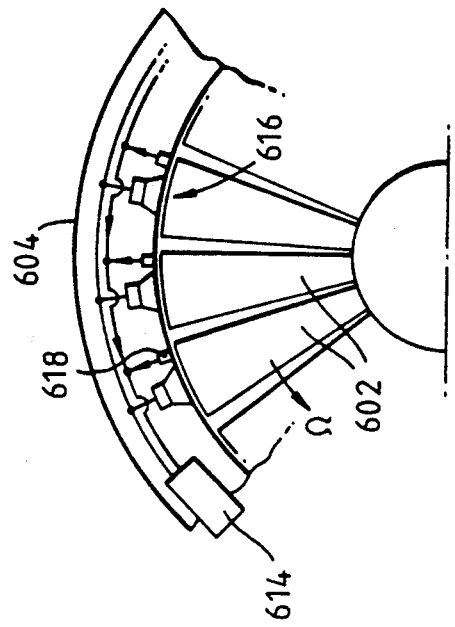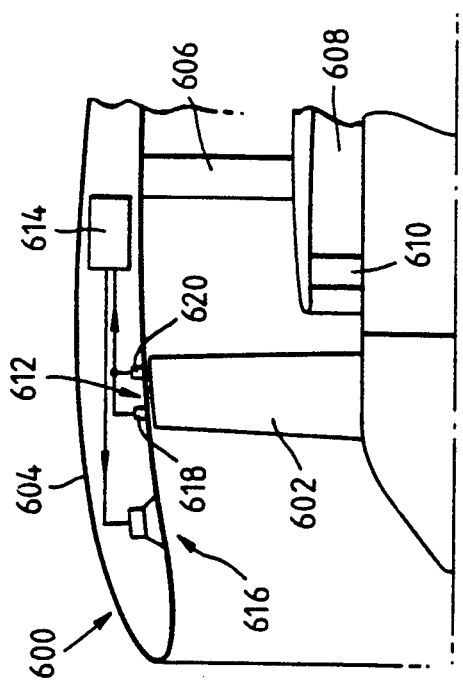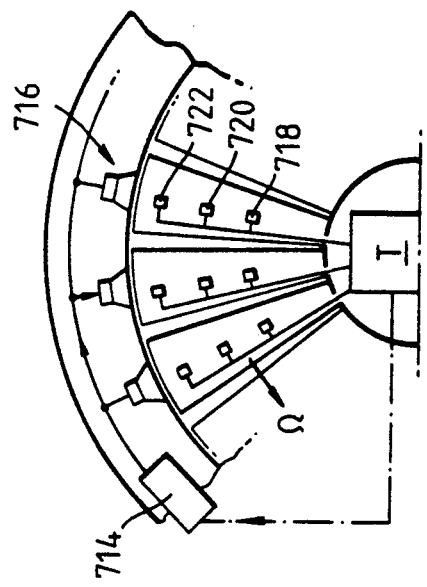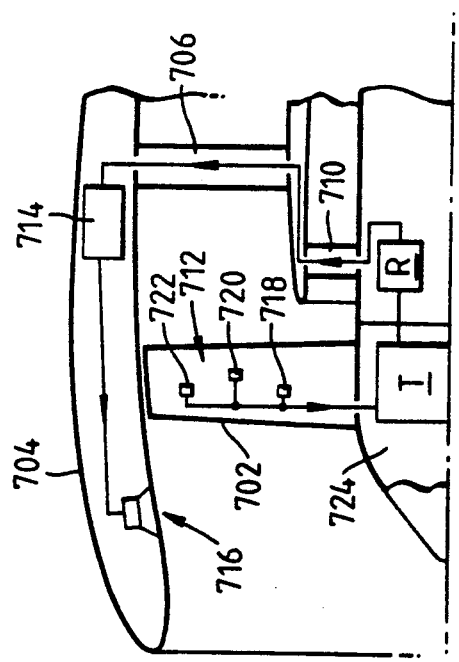

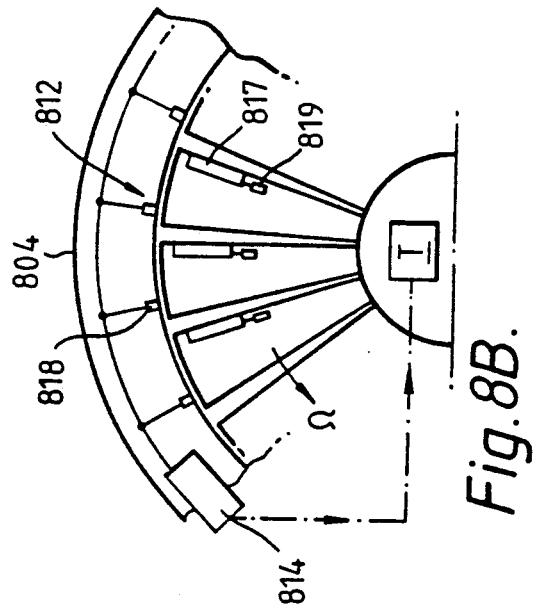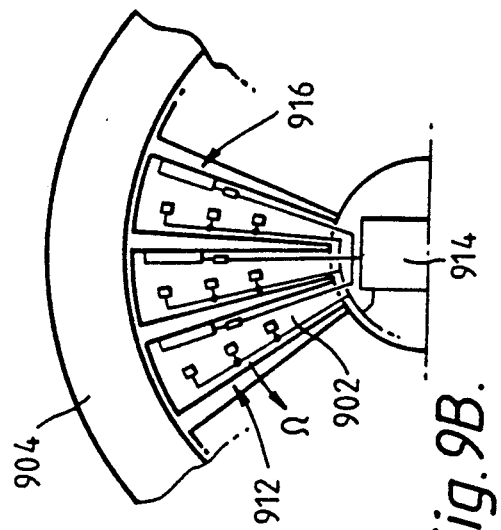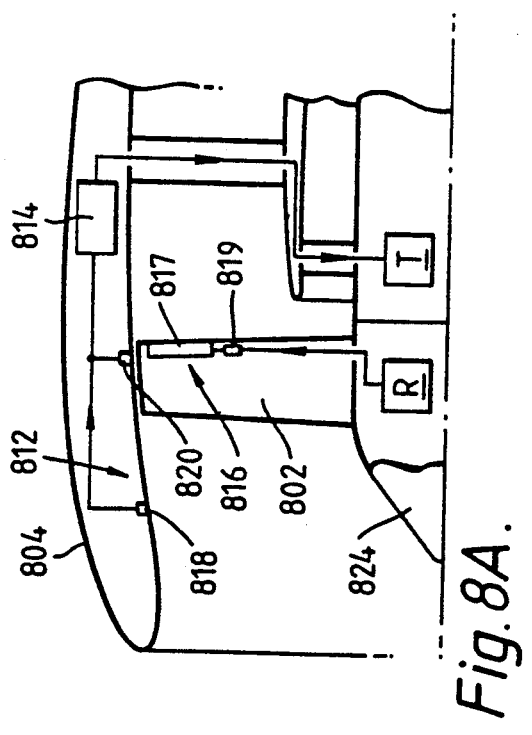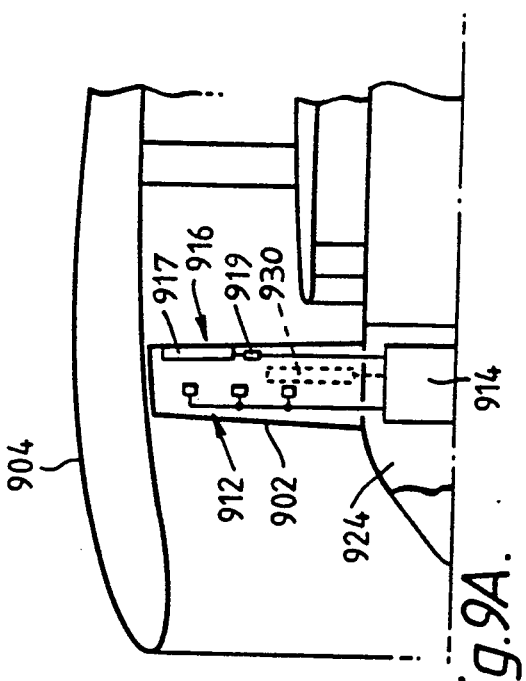

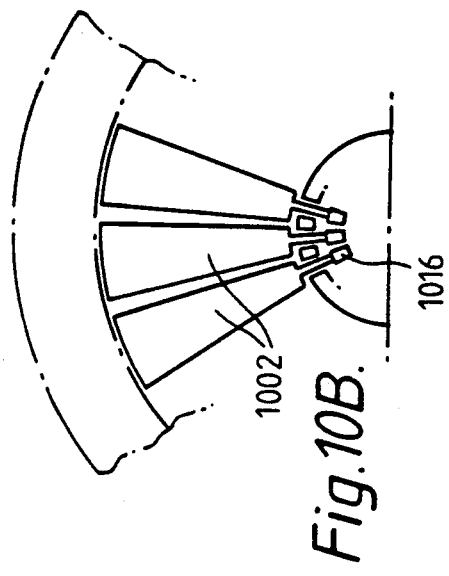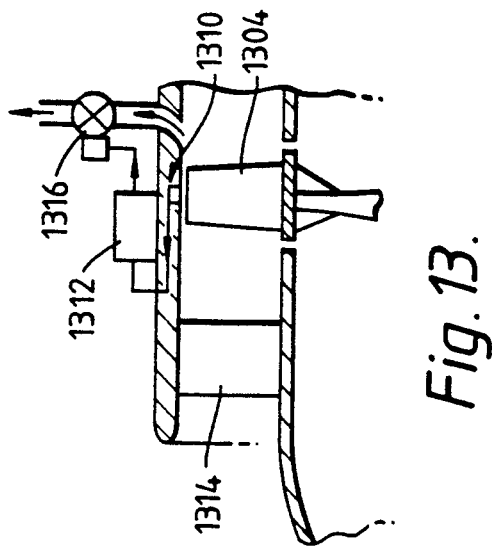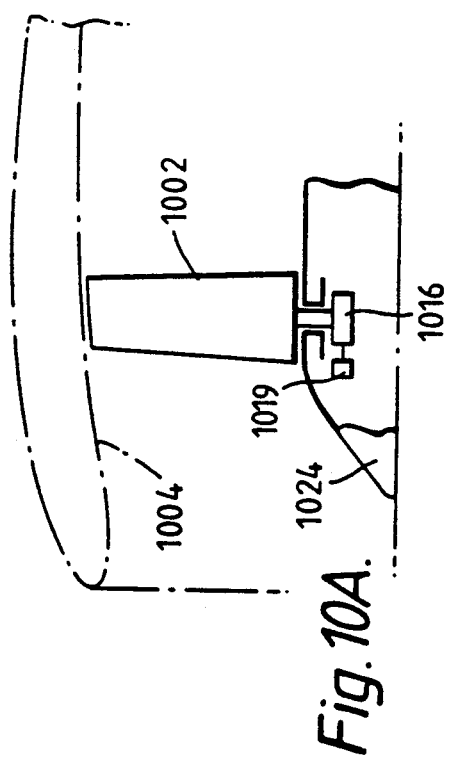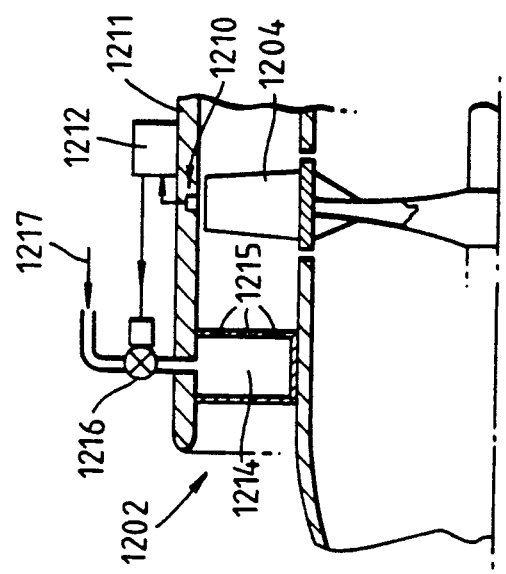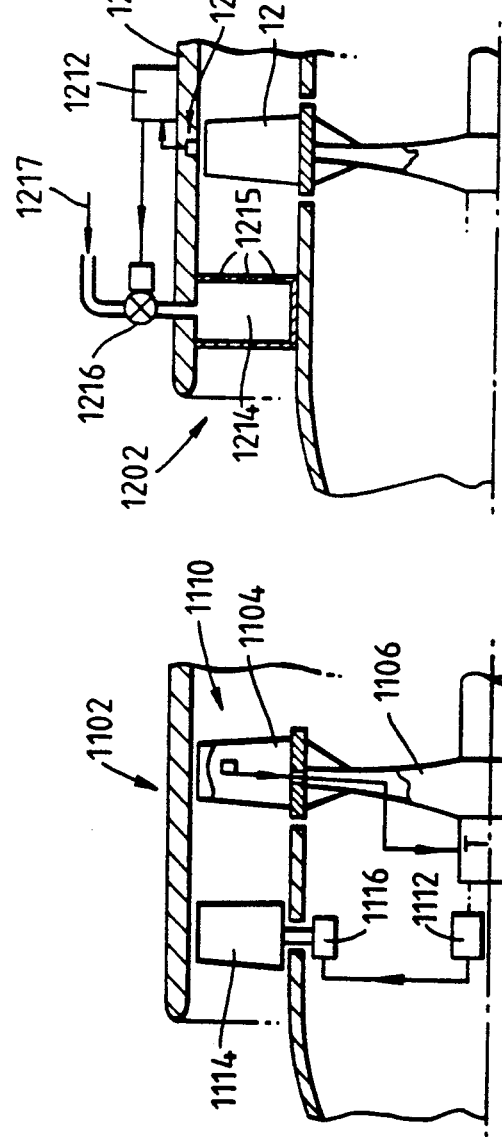

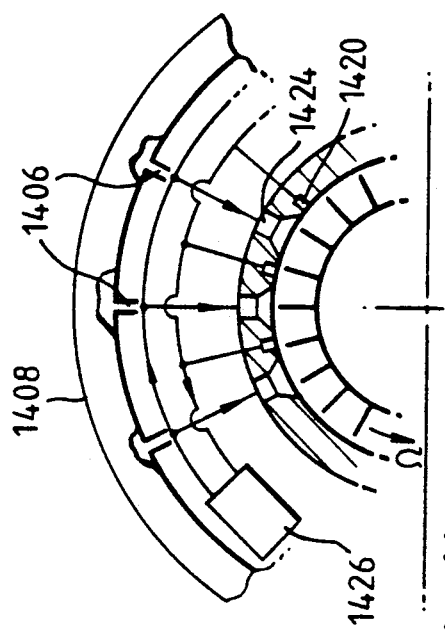
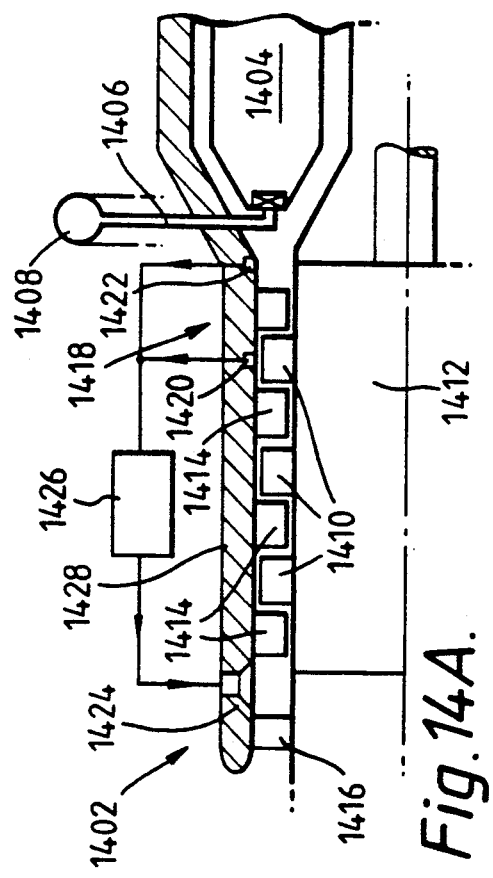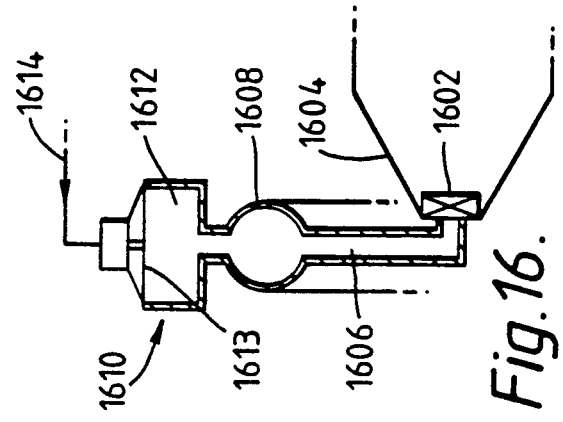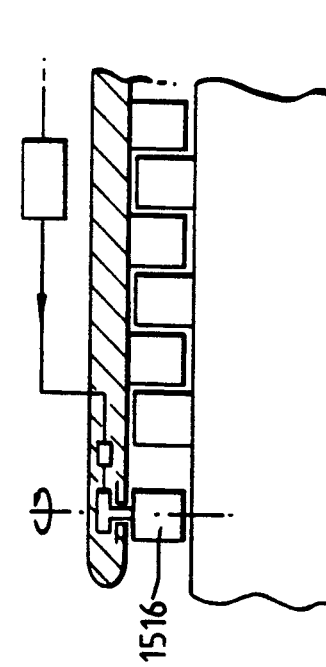

ACTIVE CONTROL OF UNSTEADY MOTION PHENOMENA IN TURBOMACHINERY

This is a division of application Ser. No. 07/187,169, filed Apr. 28, 1988 (U.S. Pat. No. 4,967,550) which is a CIP of Ser. No. 036,770, filed Apr. 9, 1987 (abandoned).

1. FIELD OF INVENTION

This invention relates to the continuous active control of unsteady motion phenomena in turbomachinery such as gas turbine engines, turbocompressors, steam turbines, turbopumps, propellers and wind power machines.

For the purposes of the present specification, unsteady motion phenomena are particularly exemplified by, but not restricted to, rotor blade flutter, surge and rotating stall in turbocompressors, rotor blade flutter being an aeroelastically excited unsteady vibratory motion in the blade and surge and rotating stall being unsteady fluid flow.

2. BACKGROUND OF THE INVENTION

Flow in turbomachines such as gas turbine engines is usually unsteady. The unsteady flows can give rise to component (e.g. rotor blade) vibration owing to the resulting unsteady loading on the components, and additional unsteadiness in the aerodynamic coupling between components such as neighbouring blades. Initially the unsteadiness takes the form of a small perturbation about the steady flow and is often associated with a small movement of the component from its steady position. When the disturbances in the system are small, we can assume that they are also linear, and as will be shown later, such an assumption can be valid in relation to active control systems and allows simplification of the control systems.

Some examples of unsteady motions in this category will now be described.

(i) Blade Flutter. A review of the general features of turbo-machinery flutter is given by F. O. Carta of USAF Aero Propulsion Laboratory in chapter 22 of the book "The Aerothermodynamics of Aircraft Gas Turbine Engines", edited by G. C. Oates, 1978 (Serial No. AD/A059784). In flutter, the blades vibrate, and as a result extra aerodynamic forces act on the blades. At certain flow conditions these forces may have a phase relationship with the blades that causes energy to be transferred from the airflow to the blade. Flutter occurs when this energy transfer exceeds the energy dissipated in the structure of the blades, resulting in increasing amplitude of vibration. While flutter may occur for a single blade of the machine, in most cases it involves all the blades. These blades are coupled together either structurally or by the unsteady aerodynamic forces. When the individual blades are identical, vibration of the bladed disc is made up of a number of modes (so-called "assembly modes") in which the blades have fixed phase angle to one another; usually only a small number of these modes is unstable and is involved in flutter.

When the individual blades are non-identical, a set of phenomena collectively known as mistuning become important. The modes described above are disrupted and may be localised at one position on the bladed disc. In general, mistuning increases stability and reduces the susceptibility to flutter. For further information on mistuning, see the paper by Crawley and Hall entitled "Optimisation and Mechanisms of Mistuning in Cascades". ASME 29th Int. Gas Turbine Conf. Paper 84-ST-196, Amsterdam, June 4-7, 1985.

It should be noted that the present invention is applicable to flutter modes of individual blades, for example first flap, second flap, first torsion, second torsion, etc., and also to the assembly modes, involving coupling between blades in the same rotor which give rise to vibrations having particular numbers of nodal diameters. Note that the assembly modes can rotate at speeds other than the disc rotational speed.

(ii) Forced Vibration. Besides the forces due to its self-motion described above, the blades of the rotor are acted on by unsteady aerodynamic forces due to their interaction with upstream or downstream disturbances. These may be due to, for example, distorted inlet flows to an engine, turbulence, or the wakes from upstream blade rows. If the frequency of these aerodynamic forces coincides with the resonant frequency of the blades, large vibration amplitudes may result. The vibrational modes of the bladed disc in this phenomenon are similar to those for flutter. Mistuning can also be important. In this case it often increases the vibration levels, see for example MacBain and Whaley, "Maximum Resonant Response of Mistuned Bladed Discs" in "Vibration of Bladed Disc Assemblies", p. 153-160, ASME 1983, Edited by D. J. Ewins. and A. V. Srinivason.

(iii) Surge and Rotating Stall. These phenomena are discussed in an article by Greitzer, "Axial Compressor Stall Phenomena", ASME J. Fluids Eng. 102,134-151, June 1980. When a compressor is run at constant speed and has its load increased, a point is reached at which the flow becomes unstable and the pressure rise through the compressor reaches a maximum. The instability can either be in the form of surge or rotating stall. In the former, the flow oscillates in a predominantly axisymmetric manner dependent on the characteristics of the compressor and its inlet and exit flow systems. In rotating stall, there are a number of 'stall-cells', which are patches where the flow over several rotor blades is stalled. These rotate at roughly half the speed of the compressor rotor. A paper by Moore, "A Theory of Rotating Stall of Multistage Axial Compressors", Parts I-III, ASME 28th Int. Gas Turbine Conf., Paper 83-GT-44,45,46, Phoenix, Ariz., Mar. 27-31, 1983, shows that at their inception, both these phenomena are linear.

(iv) Acoustic Resonance. The reader is referred to a paper by Parker and Stoneman, "Acoustically Excited Vibration of Compressor Blades", Int. Conf. on Vibrations in Rotating Machinery, Paper C 321-84, York, England September, 1984. This phenomenon arises from a resonance of the air inside a blade row and is associated with an unsteady motion of the air flow that travels round the annulus of the machine at nearly sonic speed. The resonance can be self-excited by vortex shedding from the trailing edges of the blade row at resonance. The vortex shedding couples to the resonance to produce large amplitudes of vibration which can cause structural failure. The resonance is strongly affected by the geometry of the upstream and downstream flows and by the spacing between blade rows. Again it must be linear at its inception.

Clearly, acoustic resonance as defined here requires the blades to be contained within a surrounding casing and is most likely to arise in turbocompressors and turbines of the axial flow types.

The unsteady motion phenomena mentioned above cause particular problems in the operation and control of turbomachines, particularly gas turbine aeroengines, Stated in the most general way, the main problematic effect of these phenomena is to cause the operating range of the turbomachine in which they occur to be restricted—e.g. by means of special scheduling of the main engine fuel control system—so as to avoid troublesome conditions caused by th phenomena.

Much previous research has concentrated on devising control systems which enable turbomachinery to operate over a wider range of conditions than would otherwise be possible, the control systems involving sensing a threshold level of a condition in the turbomachine indicative of the onset of a troublesome unsteady motion phenomenon and taking corrective action in the form of initiating a step change in an operating characteristic of the turbomachine whenever the threshold level is exceeded. This approach is illustrated by U.S. Pat. No. 4,196,472 to Ludwig et al, which relates to a system for controlling rotating stall in axial flow compressors of turbopropulsors. For a full appreciation, the reader is referred to the, patent, but the control system therein described may be characterised as operation by sensing unsteady pressures in the compressor, filtering and rectifying them, generating a control signal from the resultant pressure signals whenever they exceed a threshold value indicative of the onset of rotating stall, and using the control signal to actuate means producing a step change in a compressor characteristic which eliminates the imminent rotating stall. The step change in a compressor characteristic may be produced by such means as opening a compressor bleed door, adjusting the angle of stator vanes, or even altering exhaust nozzle area or fuel flow to the combustor.

Whilst the Ludwig et al control system would seem to be effective in enabling reduction or elimination of stall safety margins, thus enabling beneficial gains in engine performance, control systems enabling even further gains to be made would be desirable.

One line of research which has been noted by the present applicants concerns continuous active suppression of flutter and alleviation of gust effects on aircraft wings. See for example Meirovitch and Silverberg, "Active Vibration Suppression of a Cantilever Wing", J. Sound and Vibration 97, 489–498, 1984. There, a feedback system was used to drive control surfaces on the wing in such a manner as to reduce the vibration amplitude, the control surfaces being in motion at a frequency approximately the same as the vibration in the wing, but the motions being such as to counter the effects of the vibrations, thereby enabling the wing to perform better under extreme conditions.

As mentioned previously, the available operating ranges of turbomachines, as exemplified by gas turbine aeroengines, is limited by blade flutter, by other instabilities such as rotating stall and surge, by vibration due to distorted flows, and by acoustic resonance. It occurred to the present applicants, even though the dynamics of turbomachines differ conceptually from those of an aircraft wing, that suitable fast active control systems could perhaps be used to give continuous active control of these unsteady motion phenomena, thereby increasing the operating range of engines and enabling relaxation of constraints on aerodynamic and mechanical design. In turn, this would enable designs of greater aerodynamic efficiency and less weight.

Consequently, it is an object of the present invention to enable an increase in the range of operating conditions of turbomachinery.

It is an allied object of the invention to maximise performance gains in respect of turbomachines.

3. SUMMARY OF THE INVENTION

The present invention uses active control techniques to control the instabilities or disturbances comprising the unsteady motion phenomena already mentioned.

Accordingly, the present invention provides a turbomachine with a control system for actively controlling the dynamics of at least one mode of at least one unsteady motion phenomenon associated with the blading of said turbomachine, said control system having a control bandwidth which is at least partly coextensive with the bandwidth of said unsteady motion phenomenon and comprising:

(a) sensor means located in said turbomachine in predetermined relationship to said unsteady motion phenomenon for continuously producing sensor signals related to said unsteady motion phenomenon;

(b) signal processing means for continuously processing said sensor signals, comprising
  (i) mode filter means having at least one channel with a frequency response such that sensor signal components related to said at least one mode of said unsteady motion phenomenon are selected for output from said mode filter means, and
  (ii) control output converter means having at least one channel for continuously amplifying and phase-shifting the output of said at least one channel of the mode filter means thereby to produce control signals having controlled phase and amplitude relationship to said at least one mode of said unsteady motion phenomenon;

(c) actuator means located in said turbomachine in predetermined relationship to said unsteady motion phenomenon, said actuator means being continuously driven by said control signals for producing varying outputs having physical effects in said turbomachine;

said signal processing means controlling said outputs from said actuator means to act counter to said at least one mode of said unsteady motion phenomenon. It should be understood here and subsequently in this specification that the outputs from the actuator means are controlled to act "counter" to the unsteady mode or modes in the sense not only of acting to cancel the mode(s), but also more importantly in the sense of acting to change the dynamics of the mode(s) in order to minimise the physical effects of those dynamics on the turbomachine.

Such a control system increases the range of conditions over which the turbomachine can operate and maximises performance gains of the turbomachine by enabling the turbomachine's continuous operation in a condition which, but for corrections continuously applied by the control system, would result in destructive or otherwise undesirable effects in the turbomachine.

Reference is made above to the actuator means being continuously driven by the control signals and the actuator means having varying outputs. It should be noted that the word "continuously" is used herein in a relative sense to include stepwise operation of the actuators with short rest periods, in that although the actuators will probably not be moving or otherwise giving an output at every moment during operation of the control system, they will nevertheless operate at frequencies of the same order as the frequencies of the phenomenon it is desired to control, this being necessary to maintain active control of the phenomenon The sensor means may comprise sensors of the type producing a direct measure of the unsteady motion phenomenon. Alternatively, they may be of the type producing an indirect measure of the unsteady motion phenomenon. For example, if the unsteady motion phenomenon comprises vibration of components, strain gauges on the components sensing amplitude of vibration would provide a direct measure, while pressure transducers sensing a pressure field associated with the vibration would provide an indirect measure.

The actuator means may comprise actuators of the type directly countering the unsteady motion phenomenon. Alternatively, they may be of the type indirectly countering it. For example, if the unsteady motion phenomenon comprises vibration of components, piezoelectric or magnetostrictive materials attached to the component could act directly counter to the vibrations, whereas electromagnetically driven diaphragms arranged in the vicinity of the components could indirectly suppress the vibrations by creating a pressure or velocity field which acts counter to the pressure or velocity field associated with the vibration.

Preferably, the control system is a state-space type of control system. Preferably the control system is adapted to minimise both the energy level of the selected mode of the unsteady motion phenomenon as sensed by the sensor means, and also the amount of energy consumed by said actuator means. This latter amount can be measured by a parameter known as the cost of control. The cost of control is defined as the performance penalty exacted from the turbomachine in order to supply the actuators with the power necessary to achieve control of the unsteady motion phenomenon. This performance penalty must be less than the performance gain achieved by use of the control system.

In one embodiment of the invention, the turbomachine comprises a turbocompressor and the unsteady motion phenomenon is surge in the turbocompressor, the sensor means comprising at least one sensor and the actuator means comprising at least one actuator. Surge being predominantly axisymmetric and usually unimodal, the mode filter means and the control output converter means could conceivably comprise a single channel.

Preferably, the at least one sensor comprises a pressure sensor located either in the casing of the turbocompressor or in a further part of the turbomachine downstream of the turbocompressor, to sense pressure fluctuations associated with said surge.

Preferably, the at least one actuator comprises at least one diaphragm or the like effective to modulate the pressure and velocity field in the turbocompressor when driven by associated electrical drive means and located either in the casing of the turbocompressor or in a further part of the turbomachine downstream of the turbocompressor. The electrical drive means is of course driven by the control signals from the control output converter means so that the diaphragm(s) modulate the pressure and velocity field to counter the surge. In the case of a gas turbine engine, such an electrically driven diaphragm may alternatively be located in a fuel system of the gas turbine engine thereby to modulate the flow of fuel in the fuel system and so indirectly modulate the fluid pressures and velocities in the turbocompressor.

In a further variation, the at least one actuator may comprise a plurality of variable elements in at least one row of stator vanes or the like, the variable elements being variable in angular position with respect to fluid flow therepast. The variable elements may be constituted by means of at least some vanes in the row(s) having their aerofoils variable as a whole, or a part of at least some vanes, such as their aerofoil leading or trailing edges, may be variable. Drive means connected to the variable elements are driven by the control signals to drive the variable elements and perturb fluid flow therepast to counter the surge.

In another embodiment of the invention, the turbomachine comprises a turbocompressor and the unsteady motion phenomenon is rotating stall in the turbocompressor, the sensor means comprising an array of sensors, the signal processing means having a plurality of channels, and the actuator means comprising an array of actuators.

Preferably, the array of sensors comprises a plurality of pressure sensors angularly spaced around the turbocompressor, e.g. around the inner circumference of its casing, to sense pressure fluctuations associated with the rotating stall. There may be more than one row of the sensors.

As for the sensors, the array of actuators may comprise at least one row of actuators angularly spaced apart from each other around the turbocompressor. Since rotating stall is multimodal, the actuators should be driven independently of each other by the control signals from the control output converter means and should consequently be effective to modulate pressure and velocity fields in the turbocompressor to counter one or more troublesome modes of rotating stall, without exciting other modes. The latter aspect of the invention is more fully set out later.

Preferably the array of actuators comprises a plurality of diaphragms or the like angularly spaced around the inner circumference of the compressor casing and driven by electrical drive means in accordance with the control signals to modulate the fluid pressures and velocities in the turbocompressor at selected points therein to counter the troublesome mode(s). There may be more than one circumferentially extending row of the actuators.

In a further variation, the actuator array may comprise a plurality of variable elements in at least one row of stator vanes or the like, the variable elements being variable independently of each other in angular position with respect to fluid flow therepast. The variable elements may be constituted as previously mentioned in connection with surge control, but are independently driven by drive means in accordance with the control signals to perturb fluid flow therepast and thereby modulate the pressure and velocity fields.

In a further embodiment of the invention, the unsteady motion phenomenon is acoustic resonance in one or more blade rows of the turbomachine, the sensor means again comprising an array of sensors, the signal processing means having a plurality of channels, and the actuator means comprising an array of actuators. The turbomachine may be either an axial flow turbocompressor or turbine, the sensors and actuators preferably being similar to those mentioned above in relation to rotating stall, but located appropriately in either the compressor or turbine.

In yet a further embodiment of the invention, the unsteady motion phenomenon is flutter or forced vibration of rotor blades in at least one row thereof in the turbomachine, the sensor means again comprising an array of sensors, the signal processing means having a plurality of channels, and the actuator means comprising an array of actuators.

The sensor array may comprise pressure transducers sensing a pressure field associated with the phenomenon. Alternatively, the sensors may comprise strain gauges for sensing strain in the rotor blades caused by the flutter or vibration. The strain gauges may be mounted on the blades or incorporated therein, and may be, for example, of the piezoelectric type.

The actuators may comprise nozzle means and valve means connected to control supply of a pressurised fluid to the nozzle means, the nozzle means directing jets of the fluid onto the at least one row of rotor blades or into the fluid flow upstream of the rotor blades, the valve means being driven by the control signals from the control output converter means in order to vary or modulate the jets of fluid and thereby control the flutter or vibration. In a variation of this approach, suitable for use in conjunction with hollow fluid-cooled turbine rotor blades of the type having holes therein for the exit of spent cooling fluid therefrom into the main fluid stream, valve means similarly driven by the control signals may be used to modulate the entry of pressurised cooling fluid into the turbine blades and consequently vary the exit mass flow of the cooling fluid from the holes, thereby to control one or more troublesome modes of the flutter or vibration.

Alternatively, the actuators may comprise the general types mentioned in connection with rotating stall, such as circumferentially extending rows of electrically driven diaphragms or the like located in a casing surrounding the rotor blades, or independently variable elements in at least one row of stator vanes or the like. Such variable elements are located in flow relationship to the at least one row of rotor blades for modulating the flow in the row of rotor blades at selected points therein.

It should be noted in respect of the above embodiments that if the frame of reference of the signal processing part of the system is different from the frame(s) of reference of the sensors and/or the actuators —as it would be for embodiments of the invention in which the sensors and/or actuators rotate with rotors in the turbomachinery but the rest of the control system is attached to non-rotating structure—the control system must incorporate means for fixing the frame of reference of the signal processing part of the system relative to the frame(s) of reference of the sensors and/or actuators. Means for fixing the frame of reference conveniently comprises heterodyning means or digital signal processing means equivalent thereto.

It should further be noted in respect of the above embodiments that the mode or modes of the unsteady motion phenomenon being controlled by the control system may change significantly in frequency not only between different turbomachines but also due to changes in operating conditions internally and externally of a particular turbomachine e.g. due to differing operating altitude or differing power levels. It is also axiomatic that in many cases the control exerted on the troublesome mode or modes by the control system will in fact cause a significant frequency shift in the mode(s) being controlled. In all such cases, the signal processing means should include means for varying the frequency response of the channel(s) of the mode filter means to match the variations in frequency or frequencies of the mode or modes of the unsteady motion phenomenon, and of course it should also include means for varying the amounts by which the output or outputs of the mode filter means is/are amplified and phase-shifted in the control output converter means.

One the one hand it should be noted that surge in turbocompressors is essentially a one-dimensional phenomenon (i.e. there is effectively only one mode of unsteady motion in surge) and that therefore it is possible to conceive a simple surge control system according to the invention comprising one sensor, one actuator and a mode filter means having only one channel. On the other hand, rotating stall, blade flutter, forced blade vibration and acoustic resonance can all have more than one mode of unsteady motion and this necessitates a more complex control system if it is to adequately control all the dominant modes of an unsteady motion phenomenon over a range of operating conditions of the turbomachine.

Consequently, the invention further provides a control system in which the sensor array means comprises a plurality of sensors, the mode filter means comprises a plurality of channels, and the actuator array means comprises a plurality of actuators, the control system comprising means for obtaining a plurality of different sums of the sensor signals from a plurality of the sensors in predetermined combinations thereof, means for differentially weighting said sums of the sensor signals thereby to obtain independent measures of a plurality of modes of the unsteady motion phenomenon, and means for differentially weighting the control signals from the control output converter means such that the outputs of the actuators are weighted with respect to each other thereby to counter the selected mode or modes without causing other modes to become unstable.

4. BRIEF DESCRIPTION OF THE DRAWINGS

Embodiments of the invention will now be described, by way of example only, and also with reference to the accompanying drawings, in which FIG. 1 is a block diagram illustrating the interaction of an active control system according to the invention with a rotor blade system subject to flutter;

FIGS. 6 to 11 and 17 are sketches of possible physical layouts in gas turbine aeroengines for blade flutter and vibration control systems according to the invention; and FIGS. 12 to 14 are sketches of possible physical layouts in gas turbine aeroengines for compressor surge and rotating stall control systems according to the invention.

5. DETAILED DESCRIPTION OF EMBODIMENTS OF THE INVENTION

Figure 1:
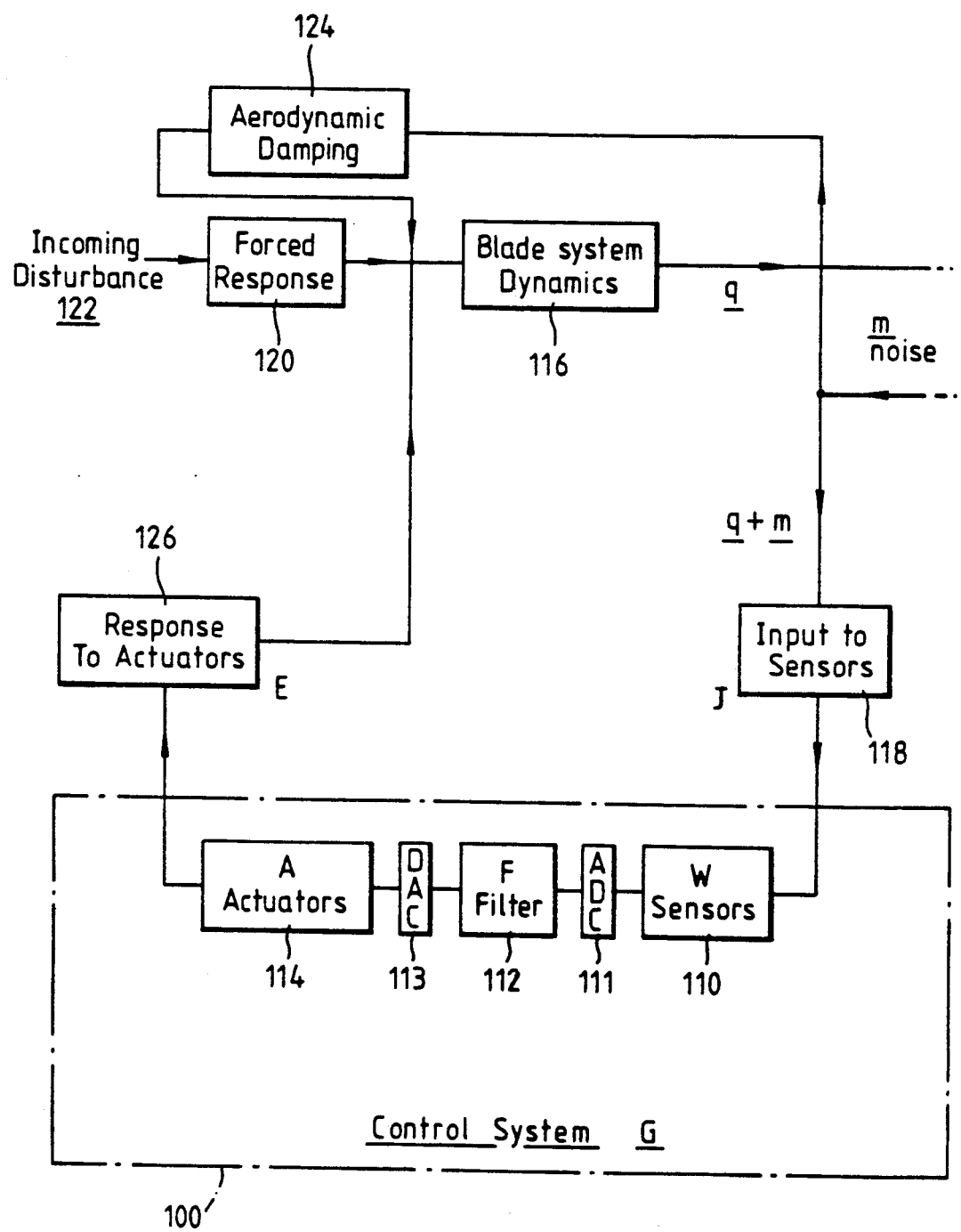

The embodiments to be described all comprise active control systems ,to control unsteady motion phenomena in a turbomachine, in particular a gas turbine aeroengine.

Active control is a technique whereby a controlling disturbance is added to the unsteady motion in such a way as to reduce the amplitude of the fluctuations. The control strategy can be thought of in two distinct ways but in practice the result is the same. The controlling disturbance can be used to cancel the unsteady input which causes the unsteady motion in the engine or it can be used to act on the internal aeroelastic interaction to increase the internal damping and thus reduce the response of the system. The essentials of an active control system are sensors to monitor some measure of the fluctuation, actuators to generate the control disturbance and a stable controller or signal processor which connects them.

In the following sections control of particular unsteady motion phenomenon will be analysed and at least one embodiment of an active control system will be devised to counter each phenomenon. Specific sensors and actuators will also be discussed, as will control systems devised according to alternative control theories.

5.1 BLADE FLUTTER

Simplified Analysis

In this subsection, we first describe a model for the structural dynamics of turbomachine blades that includes the interaction with flow that leads to flutter, and we then go on to consider a simplified model problem that demonstrates the feasibility of active control.

In a completely general way, the equation of motion for vibration of the blade assembly is given by:

$$M\underline{\ddot{x}} + \Lambda\underline{\dot{x}} + K\underline{x} = \underline{f} \quad (1)$$

where $\underline{x}$ is a generalised displacement; M, $\Lambda$, K are the structural mass, damping and stiffness matrices, and $\underline{f}$ is the forcing.

Provided that suitable co-ordinates are chosen, the matrix M will be diagonal and $\Lambda$ and K will be symmetric. We assume that forcing is either due to an incoming aerodynamic disturbance $\underline{f}^{(1)}$ say, or due to so-called negative aerodynamic damping $\underline{f}^{(2)}$ say, so that $\underline{f} = \underline{f}^{(1)} + \underline{f}^{(2)}$ where $\underline{f}^{(2)}$ is related to the blade motion by $$\underline{f}^{(2)} = \omega^2 L \underline{x} \quad (2)$$

L is a (complex) matrix of influence coefficients whose elements $L_{ij}$ represent the force on blade i due to the motion of blade j. The elements of the matrix can be estimated from numerical calculation of unsteady blade aerodynamics: this is described by Crawley in "Aeroelastic Formulations for Turbomachines and Propellers", IUTAM Symposium, Cambridge, September 1984. The unsteady aerodynamic coefficients have also been measured experimentally in cascades (Szechenyi, Cafarelli, Notin & Girault, "Straight Cascade Wind-Tunnel Study of Fan Blade Flutter in Started Supersonic Flow", IUTAM Symposium, Cambridge, September, 1984). It turns out in practice that L is nearly tridiagonal i.e. the movement of any blade causes significant forces only on its nearest neighbours.

The forcing $f^{(1)}$ corresponds to the engine order forcing which gives rise to forced response as described previously. Since we are concerned primarily with flutter we shall assume in the rest of this section that $\underline{f}^{(1)} = 0$ and $\underline{f} = \underline{f}^{(2)}$. As the equations are linear, we can further assume that all quantities have a time dependence $\exp(-i\omega t)$ so that equation (1) may be written:

$$(-\omega^2 M - i\omega\Lambda + K)\underline{\bar{x}} = \underline{\bar{f}}^{(2)} \quad (3)$$

where $\underline{x} = \underline{\bar{x}} e^{-i\omega t}$ etc. and $\underline{f}^{(2)}$ is given by equation (2).

In the usual way, equation (3) may be used to determine the structural modes of the blade assembly. To do this we set the right hand side of the equation to zero and neglect the damping to solve $$(-\omega^2 M + K)\underline{\bar{x}} = 0 \quad (4)$$

which has eigenvectors $\underline{\bar{x}} = \underline{\phi}^{(n)}$ corresponding to natural frequencies $\omega_n$, and the orthogonal matrix of eigenvectors may be written as $\Phi$ (this is the matrix which diagonalises K). This enables us to write equation (3) in terms of normal (modal) co-ordinates, $\underline{q} = \Phi^t M \underline{x}$ which is useful in our analysis of flutter, (provided that we may still ignore the damping) since the left hand side of the equation is now uncoupled. Coupling is however provided by the aerodynamic forcing since in general $\Phi^t L \Phi$ is not diagonal. Written this way, equation (3) becomes $$(-\omega^2 I + \Delta)\underline{\bar{q}} = \omega^2 \Phi^t L \Phi \underline{\bar{q}} \quad (5)$$

where $\Delta$ is the diagonal matrix $\omega_n^2 I$ and $\Phi$ is chosen so that the normalisation gives $\Phi^t M \Phi = I$.

The aerodynamic forcing may therefore excite any of the structural modes; it will also slightly modify the mode. To determine this then it is necessary to find the eigenvalues of equation (5). Flutter is said to occur when the resulting (complex) frequency has a positive imaginary part; this is the point when the energy extracted from the air by the aerodynamic forces just matches the energy dissipated in the structure.

To discuss this in more detail we shall make some simplifying assumptions. Firstly, we note that equation (3) describes the motion of the system with many degrees of freedom, $n \times N$, say, where n is the number of degrees of freedom per blade and N is the number of blades. We shall now assume that each blade has only a single degree of freedom so that $n = 1$ and the components of $\underline{x}$ are corresponding displacements on each blade. If we further assume that each blade is identical, and the blades are structurally uncoupled so that K is also diagonal, then in the absence of damping, equation (3) is of the form $$(-\omega^2 I + \omega_0^2 I)\underline{\bar{x}} = \omega^2 \frac{L}{\mu} \underline{\bar{x}} \quad (6)$$

where $\omega_0$ is the natural frequency of each blade, and $\mu$ is a constant. The displacements $\underline{\bar{x}}$ are now also the normal coordinates given in equation (5).

The eigenvalue problem of equation (6) may be written as $$\Omega^2 \left[ I + \frac{1}{\mu} L \right] \underline{\bar{q}} = \underline{\bar{q}} \quad (7)$$

where $\Omega = \omega/\omega_0$ and for most turbomachinery blades $|L_{ij}|/\mu << 1$ The effect of the aerodynamic forcing is to make small changes in the natural frequencies so that this equation gives complex eigenvalues of the form $\lambda=1+\epsilon\lambda_1$ ($\lambda=\Omega^{-2}$) corresponding to $\omega=\omega_o+\epsilon\omega$ where $\lambda_1 \simeq -2\omega_1/\omega_o$ and $\omega_o$ is of course real. The system will flutter when $\text{Im}(\omega_1)>0$, i.e. $\text{Im}(\lambda_1)<0$.

We propose a form of control which will cause these vibrations to be damped. This may be done by superimposing additional loading on the blades in response to measured blade loading. In a general way $\underline{f}^{(2)}$ may be replaced by $(1+\alpha)\underline{f}^{(2)}$ in equation (6); equation (7) then becomes $$\Omega^2 \left[ I + \frac{1}{\mu} L + \frac{1}{\mu} \alpha L \right] \underline{\bar{q}} = \underline{\bar{q}} \quad (8)$$

We wish to devise forms of the matrix $\alpha$ which will control the instabilities of the system and also may be practicably realisable. We shall demonstrate stabilisation of flutter for this system by considering an assembly of just four blades A suitable form for $\alpha$ would allow for the loading on each blade to control itself and both of the neighbouring blades so that the matrix $\alpha$ would be:

$$\begin{matrix} \alpha_s & \alpha_f & 0 & \alpha_b \\ \alpha_b & \alpha_s & \alpha_f & 0 \\ 0 & \alpha_b & \alpha_s & \alpha_f \\ \alpha_f & 0 & \alpha_b & \alpha_s \end{matrix}$$

where the elements are complex and $\alpha_s$ corresponds to "self" control, and $\alpha_f$ and $\alpha_b$ are the coefficients for blades in the forward and backward directions respectively. In this example, we have assumed that the control on each blade is identical and this will of course exclude the possibility of control in the form of deliberate mistuning.

The complex eigenvalues of equation (8) are therefore $$\lambda = 1 + \frac{1}{\mu} \{(1 + \alpha_s)L_o + (\alpha_f + \alpha_b)(L_1 + L_3) \pm \quad (9)$$

$$[(\alpha_f + \alpha_b)L_o + (1 + \alpha_s)(L_1 + L_3)]\}$$

and $$\lambda = 1 + \frac{1}{\mu} \{(1 + \alpha_s)L_o - (\alpha_f - \alpha_b)(L_3 - L_1) \pm \quad (10)$$

$$i[(1 + \alpha_s)(L_1 - L_3) + (\alpha_f - \alpha_b)L_o]\}$$

where $L_o$, $L_1$, $L_s$ are complex elements of the matrix L. To simplify this further we assume $L_1 \simeq L_3$ (ie. the aerofoils are approximately symmetrical) and following equation (7) these equations give $$\lambda_1 = \frac{1}{|L_o|} \{L_o(1 + \alpha_s) + 2L_1(\alpha_f + \alpha_b) \pm \quad (11)$$

$$[L_o(\alpha_f + \alpha_b) + 2L_1(1 + \alpha_s)]\}$$

and $$\lambda_1 = \frac{L_o}{|L_o|} \{1 + \alpha_s \pm i(\alpha_f - \alpha_b)\} \quad (12)$$

Equation (12) is independent of $L_1$ which corresponds to uncoupled modes of the system i.e. all blades moving in phase; or alternate blades stationary.

The system is stable for $\text{Im}(\lambda_1)>0$; if the system flutters in the absence of control, then it is necessary to choose values of $\alpha_s$, $\alpha_f$ or $\alpha_b$ so that $\text{Im}(\lambda_1)$ changes sign. This is clearly possible in this case, with simply any one of $\alpha_s$, $\alpha_f$, $\alpha_b$ present, or a combination of all three. However, it should be noted that it is not possible in this example to control the modes independently, e.g. if $\alpha_s=0$ and $\alpha_f=\alpha_b$, then the modes given in equation (12) would be unaltered but both the modes given in equation (11) would change. It would however be possible to stabilise one of these modes without causing the other to become unstable.

Suggested Active Control System

In the analysis above, it is assumed that the unsteady loading on the blade is known and control may be achieved by superimposing some function of this on the existing pressure field. The input to the control system would therefore be a measure of the loading and the system would generate a pressure field to modify this loading. The unsteady loading may for example be measured by pressure transducers on the blades or on the annulus wall. The controlling pressure field could be generated by several different means, e.g. by actuators such as oscillating flaps on the blades or actuators such as loudspeakers on the annulus walls, or by oscillation of upstream or downstream blade rows, or by variable pitch stator vanes.

In an alternative form of the control system the input could be unsteady blade movement. This blade movement could be measured for example by means of strain gauges on the blades, or by a technique involving a magnet on the blade tips that modulates the current in an electric circuit on the annulus, or by accelerometers on the blades.

Referring now to FIG. 1, we shall concentrate on just one simplified form of active electronic control system 100 and we choose a system which comprises an array of pressure sensors 110 (with associated signal processing, not shown) to generate the sensor signals which after conversion to digital form in an analogue to digital converter 111 provide the inputs for a digital multi-channel filter 112 (with associated additional signal processing, not shown). The digital filter outputs are converted to analogue signals in a digital-to-analogue converter 113 and passed to an array of actuators 114 (with associated signal processing, not shown) to drive the actuators. If suitable microprocessor-based sensors and actuators with digital outputs are employed, the ADC 111 and DAC 113 will not be necessary. The characteristics of the multi-channel filter 112, i.e. its frequency-response, may be determined either by measurements on the engine or theoretically to give the details of the forcing to or response of the blade system as seen by the sensors 110, and the coupling between the actuators 114 and the flow past the rotor blades. The objective of the control system is of course the reduction of the size of the disturbance, with a constraint to limit the controlling signal.

Some details of the coupling between the blade system and the inputs and outputs of the active control system 100 are illustrated in FIG. 1. It will be seen that the blade flutter phenomenon is manifested as one or more modes, $\underline{q}$, (defined previously) which is shown as the output of the blade system dynamics 116. The actual input 118 to the sensors 110 is considered to be the sum of the mode, $\underline{q}$, and a noise component, $\underline{m}$, which represents the noise associated with measuring $\underline{q}$.

It will further be seen that the factors feeding into the blade system dynamics 116 are threefold.

Firstly, there is the forced response 120 of the blade system to the incoming disturbance 122 which in the absence of the effect of the control system 100 would keep the blade flutter going at an undesirable level.

Secondly, there is the "natural" aerodynamic damping effect 124 shown as negative feedback from the flutter modes q.

Thirdly, there is the response 126 of the blade system to the output of the actuators 114, which of course must be sufficient, with the aerodynamic damping, to at least partly counter the forced response 120.

Figure 2:
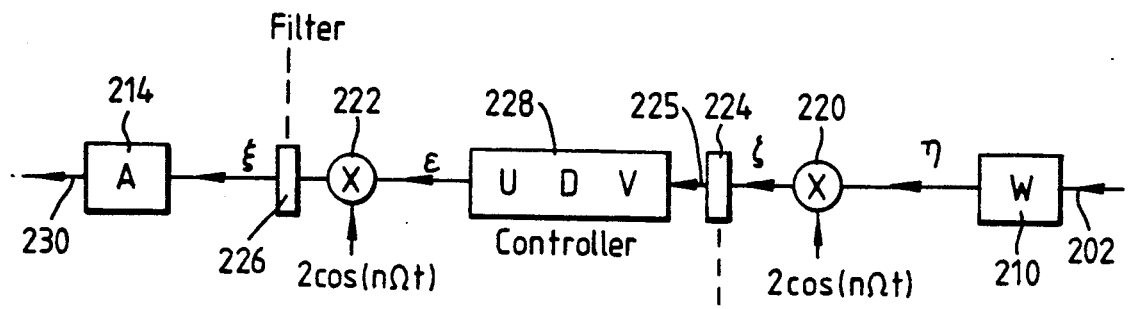
FIG. 2 is a more detailed block diagram of the active control system of FIG. 1.

Refering now to FIG. 2, there is shown a more detailed block diagram of a multi-channel control system for blade flutter which includes the heterodyning and other steps thought to be desirable for a complex case in which both the sensor array and the actuator array (plus of course the rest of the control system) are on the casing of the turbocompressor.

In the figure, the inputs 202 are taken directly from the sensor array (not shown) and passed through sensor compensating filters 210 in order to compensate for non-linear response of the sensors to the frequency range of the flutter being sensed. The filters 210, as known in the art, take the sensor signals and adjust their gain and phase so that the adjusted sensor signals are more precisely representative of the disturbances being sensed over the whole frequency range of interest. This process is represented by a diagonal frequency-dependent matrix W described later.

Since the adjusted sensor signals represent a phenomenon, namely blade flutter, whose modes of oscillation rotate with the blades, but the sensors themselves are secured to the turbocompressor casing, which is static, it is advantageous to include a stage of heterodyning 220 in order to transform the signals from the blade frame of reference to the casing frame of reference. The heterodyning signal 2 cos (nΩt) would be generated by a tachometer sensing rotation of the rotor to which the blades are attached, and would thus be phase locked to the blade frame of reference.

The heterodyned adjusted sensor signals will include unwanted frequencies created by the heterodyning process, as detailed later, and these are removed by a further filter 224 before the final versions 226 of the sensor signals are input to the main controller 228. This processes the input signals 226 using the matrices U,D and V which will be more fully described later, V being the weighting matrix for the sensors, U being the weighting matrix for the actuators, and D being the diagonal matrix of transfer functions between U and V. Matrix V in combination with matrix D provides the means whereby signals from the sensors are summed in various predetermined combinations and the sums are weighted to obtain independent measures of the flutter modes present in the blades, one or more of these being selected for control. Matrix U in combination with matrix D provides the means whereby signals representing the selected mode or modes are differentially weighted with respect to each other so that the outputs of the actuators are likewise differentially weighted in ways which counter the selected mode or modes without causing the other modes to become unstable.

The controller 228 may be characterised as including a mode filter in that it acts to automatically produce a signal or signals representative of the flutter mode or modes to be controlled by summing and weighting the sensor signals. In this sense, the controller 228 "selects" for onward transmission sensor signal components related to the mode or modes to be controlled, but it also alters their phase and gain, in that it further includes a control output converter which amplifies and phase-shifts the output of the mode filter by continuously variable amounts so as to produce signals having controlled phase and amplitude relationship to the mode or modes.

The output signals from the controller 228 are of course in the casing frame of reference and ought therefore to be transformed to the blade frame of reference so that the actuators' outputs act in the blade frame of reference. Consequently signals are subjected to a further heterodyning stage 222, again using the heterodyning signal 2 cos (nΩt).

The heterodyned output signal will again include unwanted frequencies, and these are again removed by a further filter 226. Filtered signals are then passed through actuator compensating filters 214 in order to compensate for non-linear response of the actuators to the frequency range of the signals. This is anologous to the job performed by the sensor compensating filters 210 and the process is represented by the diagonal frequency-dependent matrix A described later.

The actuator compensating filters 214, acting in conjunction with the actuator weighting matrix U in the controller 228, may be characterised as a control output converter in that they continuously amplify and phase-shift the signals selected by the matrices V and D in the controller 228 to produce actuator control signals 230 having controlled phase and amplitude relationship to the troublesome flutter mode or modes. The actuators (not shown) are then continuously driven by the control signals 230 and produce outputs which act to counter the troublesome mode(s).

Although not shown in FIG. 2, it should be noted that controller 228 is digital in operation and therefore should incorporate analogue-to-digital and digital-to-analogue conversion for input signals and output signals respectively.

The considerations outlined above in relation to FIGS. 1 and 2 will now be taken into account in order to derive equations adequately defining the control system required to counter the flutter problem.

System Equations

To investigate the required control system, we modify the equations of motion given previously to include the control elements shown in FIG. 1, and so firstly we re-write equation (1) to include the control matrix α to give $$(-\omega^2 M - i\omega \Lambda + K)\underline{x} = \underline{f}^{(1)} + (I+\alpha)\underline{f}^{(2)} \tag{13}$$

It remains convenient to work in normal co-ordinates q defined previously, and equation (13) may then be written as $$S\underline{\bar{q}} = \Phi^t \underline{f}^{(1)} + C\underline{\bar{q}} \tag{14}$$

where $S = (-\omega^2 I + \Delta - \omega^2 \Phi^t L \Phi)$
and $C = \omega^2 \Phi^t \alpha L \Phi$
where for convenience any structural damping ($\Lambda \neq 0$) has now been included by allowing the diagonal matrix Δ to be complex.

It is now also necessary to modify this equation to include the noise associated with measuring q, so that we write (14) as $$S\bar{q} = C(\bar{q} + \bar{m}) + \bar{g} \quad (15)$$

$\bar{g} = \Phi^t \bar{f}^{(1)}$ is the modal forcing due to incoming disturbances and $\underline{m}$ is the noise associated with measuring the modes. This arises due to turbulence and other unsteadiness in the flow as well as electronic noise.

We choose to work in normal co-ordinates because we are concerned with controlling individual modes. The sensors and actuators however operate with actual forces or displacements, and therefore we must consider the overall control system matrix C to be of the form $$C = EGJ \quad (16)$$

E,G and J are shown in FIG. 1; G represents the total control system and E and J relate the actual measurements to the modes, E being the response of the blade system to the actuators and J being the input of the blade system to the sensors.

The control matrix G will be of the form $$G = AFW \quad (17)$$

where W is a diagonal matrix of the sensor characteristics, A is the diagonal matrix of actuator characteristics, and F is the control filter relating sensor signals to actuator drives.

Equation (13) can be solved for the modal amplitudes, $$\underline{q} = (I - RC)^{-1} R(\underline{g} + C\underline{m}), \quad (18)$$

where $R = S^{-1}$ is the transfer function for the uncontrolled system, and for convenience we have dropped the over-bar indicating that we are dealing with amplitudes.

If any of the poles of $R(\omega)$ lie in the upper half of the complex $\omega$-plane then because the contour for the Fourier inversion integral must lie above these poles for an $e^{-i\omega t}$ time dependence, the response of the system is unstable and any small disturbance will eventually produce large displacements, which is what happens when the system flutters. Of course, if the amplitudes of the displacements become too large our linearised theory will not be valid. If a pole of $R(\omega)$ lies on the real axis then the system is marginally stable and in this simplified theory any disturbance will produce a harmonic vibration which is undamped. If the system were forced at this frequency the response would again become very large. The transfer function of the system with active control is $(I-RC)^{-1}R$. We therefore require that no poles of this function lie in the upper half of the complex $\omega$-plane.

The equations must now be recast in terms of the measured quantities so that we can design the actual control system. The output signal $\underline{p}$ from the sensors consists of the controlled vibration $\underline{y} = WJq$ corrupted by measurement noise $\underline{n} = WJ\underline{m}$. Thus $$\underline{p} = \underline{y} + \underline{n} = (I - BF)^{-1} WJRg + (I - BF)^{-1} WJ\underline{m} \quad (19)$$

where B = WJREA; B is the matrix of transfer functions between actuator drives and sensor signals.

Writing $\underline{y}_o = WJR\underline{y}$ for the vibration that would be measured in the absence of active control and noise, (18) may be written as $$\underline{p} = (I - BF)^{-1}(\underline{y}_o + \underline{n}). \quad (20)$$

The aim of the active control system is to make the controlled vibration $\underline{y}$ as small as possible (ideally zero) and to make the overall system stable. If our control succeeds in making the system stable then $(I - BF)^{-1} \underline{y}_o$ remains bounded, even though $\underline{y}_o$ can become unbounded in a marginally stable system. We cannot measure $\underline{y}$ directly, so must instead estimate it from the perceived signal $\underline{p}$. In order to have maximum confidence in our estimate of $\underline{y}$ we must aim to minimise the variance of the estimate.

Measures of Performance

A measure of the variance of the residual vibration, as measured by the sensors in the absence of noise, is $$\begin{aligned}Q &= \langle \int \underline{y}^* \underline{y} \, d\omega \rangle - \int tr\langle \underline{yy}^* \rangle d\omega \\ &= \int tr\{(I - BF)^{-1}(\langle \underline{y}_o\underline{y}_o^*\rangle + \\ &\qquad BF\langle \underline{nm}^*\rangle F^*B^*)(I - BF)^{-1*}\}d\omega\end{aligned} \quad (21)$$

where the star denotes Hermitian transpose, tr denotes the trace and $\langle . \rangle$ denotes the expected value. Ideally we wish to bring the blades to rest in the rotating frame.

However, our sensor positions are chosen to give some measure of the overall vibration, particularly in the flutter modes. More generally we might be able to obtain a better estimate of the total energy in the system by replacing $\underline{y}(\omega)$ in (21) by $H(\omega)\underline{y}(\omega)$, where $H(\omega)$ is a matrix of weighting functions.

The drives to the actuators are $$\begin{aligned}\underline{a} &= -F(\underline{y} + \underline{n}) \\ &= -F(I - BF)^{-1}\underline{y}_o - F(I - BF)^{-1}\underline{n}.\end{aligned} \quad (22)$$

A measure of the drive power output is $$\begin{aligned}P &= \int \langle \underline{a}^*\underline{a}\rangle d\omega - \int tr\langle \underline{aa}^*\rangle d\omega \\ &= \int tr\{F(I - BF)^{-1}\langle \underline{y}_o\underline{y}_o^*\rangle(I - BF)^{-1*}F^* + \\ &\qquad F(I - BF)^{-1}\langle \underline{nn}^*\rangle(I - BF)^{-1*}F^*\}d\omega\end{aligned} \quad (23)$$

The control system must be designed to minimise Q, subject to the constraints that the overall system must be stable and causal and that P must not be too large, and subject also to the physical constraints on the number and positions of actuators and sensors. Thus, the optimal choice of control systems depends upon the cross-spectral densities of the signals and the noise at the sensors.

Diagonalization of the Controller

The blades will normally only flutter in one mode at a time. Generally our control system will affect many different modes and it must be designed so that any particular mode can be prevented from fluttering without causing any of the other modes to become unstable. One way of ensuring this is to design a control system which can affect the modes independently, by weighting the actuator outputs appropriately. If we can also obtain independent measures of the modes from weighted sums of our sensor signals than our control filter F can be written as $$F = A^{-1} UDVW^{-1}$$

where D is a diagonal matrix of transfer functions and U and V are weighting matrices. $A^{-1}$ and $W^{-1}$ are diagonal, frequency dependent matrices which allow for the characteristics of the actuators and sensors. It is possible that the weighting matrices are independent of frequency. V is chosen so that VJq provides an estimate of the modes, $q_1$, which are to be controlled, that is, V is chosen so that VJ is diagonal ($[VJ]_{ij}=0$, $i\neq j$). U is similarly chosen so that EU is diagonal. If this can be done then the modes can be measured and driven independently of one another. In practice however the matrices EU and VJ will have non-zero off diagonal terms; provided that these terms are small they can be considered as additional noise.

The matrices EA and WJ depend upon the positioning and characteristics of the sources and sensors respectively, and therefore the ability to measure and drive modes independently can provide a criterion for determining the number and positioning of sources and sensors. The matrices also depend upon whether or not the sources or sensors are in the rotating frame of reference of the blade system. If they are not then the matrix U will have two outputs, one for the waves travelling forward with the blade direction of rotation and one for those travelling backward. These may be processed by a heterodyner which will now be described.

Frames of Reference

The modes of oscillation of the blades that are being controlled are fixed to a frame of reference which travels with the blades. If either the actuators or the sensors are not in the blade frame of reference then the relative motion of the two frames of reference will cause the frequencies of the signals to be transposed.

If $\phi$ is a circumferential co-ordinate in the blade frame and $\theta$ is in the casing frame then $r\phi = r\theta + r\Omega t$ where r is the radius of the point being considered and $\Omega$ is the angular frequency of the blades. A flutter mode is described by waves of the form $e^{-i(\omega t - kr\theta)}$. This can be expressed in the casing frame of reference as $e^{-i(\omega t - k(r\phi - r\Omega t))} = e^{-i((\omega + kr\Omega)t - kr\phi)}$.

For a fixed number of wavelengths n in the blade system $kr = n$. Thus the frequency of the oscillation in the casing frame will be $\omega + n\Omega$ for the wave travelling in the same direction as the blades and $\omega - n\Omega$ for the other direction. The wave number will be independent of the frame of reference.

Variation of the blade rotation rate $\Omega$ will alter the apparent frequency of the signals measured on the casing even if the frequency $\omega$ present in one rotating frame remains unchanged. It is therefore believed to be desirable to define the control system in a frame of reference effectively fixed relative to the blades where the system will be insensitive to speed changes. This can be achieved by heterodyning the signals that are being taken from or being sent to transducers in the casing frame of reference with a frequency $n\Omega$.

If both input and output are in the blade frame of reference (assuming that the rest of the control system is in the casing frame of reference) no heterodyning will be required. If the sensors are in the blade frame and the actuators in the casing frame then the two outputs from the controller matrix U, corresponding to the waves travelling forwards and backwards, will be heterodyned and filtered before being sent to the filters A, which compensate for the actuator characteristics. In this way the signals in U will be at the blade frame frequency and those in A will be at the casing frequency. If both the input and the output are in the casing frame of reference, as in FIG. 2, then two stages of heterodyning will be required, the additional stage being after the sensor compensating filters W and before the input to the modal filters, V.

The output of the sensors, $\eta$, will be of the form $$\eta = \Psi \sin\{(\omega + n\Omega)t - n\phi\} + \theta \sin\{(\omega - n\Omega)t + n\phi\}$$

The heterodyner will multiply these by $2\cos(n\Omega t)$ to form $\zeta$ $$\zeta = \Psi[\sin(\omega t - n\phi) + \sin\{(\omega + 2n\Omega)t - n\phi\}] + \theta[\sin(\omega t + n\phi) + \sin\{(\omega - 2n\Omega)t + n\phi\}].$$

The unwanted frequencies $\omega + 2n\Omega$ and $\omega - 2n\Omega$ can be filtered out of the signal, as in FIG. 2.

There will be two outputs from the controller $\epsilon$ corresponding to the two travelling modes. These will be of the form $$\epsilon = \rho \sin\{\omega t - n\phi\} \text{ and } \epsilon = \nu \sin(\omega t + n\phi)$$

The heterodyner will multiply these by $2\cos(n\Omega t)$ to form $$\epsilon = \rho\{\sin(\omega + n\Omega)t - n\phi\} + \sin\{(\omega - n\Omega)t - n\phi\}\}$$

and $$\epsilon = \nu\{\sin((\omega + n\Omega)t + n\phi) + \sin\{(\omega - n\Omega)t + n\phi\}\}$$

The first output will appear in the blade frame of reference as a wave travelling with the blades at the correct speed and a second wave travelling at twice the blade rate in the opposite direction. This second wave may upset the aerodynamics and so it should be filtered from the heterodyner output. The same is true of the second output for waves travelling against the direction of blade rotation.

Parameter Estimation

In terms of the actuator drives the sensor signals are $$\underline{y} = -B\underline{a} + \underline{y_o} + \underline{n} \qquad (24)$$

If $\underline{y_o}$ is changing sufficiently slowly then we can estimate the matrix of transfer functions, B, and the uncontrolled signal $\underline{y_o}$ from (23) by measuring $\underline{y}$ for a series of different drives, $\underline{a}$. If sufficient measurements are made so that the resulting system of equations is overdetermined we can also obtain estimates of $<\underline{nn}^*>$. An estimate of how fast $\underline{y_o}$ is changing may be obtained from measurements of the blade rotation rate and possibly by additional upstream sensors.

Choice of Filter

Once B, $<\underline{y_o}\underline{y_o}^*>$ and $<\underline{nn}^*>$ have been obtained, the optimal filter F can be found which stabilises the system and minimises Q in equation (21), subject to the physical constraints such as (22).

Control of a Single Mode

If the control filter can be diagonalised as above then the analysis of the effect of our control system is simplified since we can study a single mode. The analysis for a non-diagonal filter can be carried out in a similar fashion by considering the new modes of the controlled system.

From equation (19) the component of the measured vibration which is due to blade vibration is $$\underline{y} = (I - BF)^{-1}\underline{y}_0 + (I - BF)^{-1}BF\underline{n} \quad (25)$$

The control system can estimate a subset $q_1$ of the system modes, where $$\underline{q}_1 = VW^{-1}\underline{y} - VJ\underline{q}. \quad (26)$$

If we can measure all of the system modes then VJ will be the identity I, otherwise VJ will not be square but will have '1' down the leading diagonal and zeros everywhere else.

Using (25) and (26) we have $$\underline{q}_1 = (I - R_1 D)^{-1} R_1 \underline{g}_1 + (I - R_1 D)^{-1} R_1 D \underline{m}_1 \quad (27)$$

where $\underline{g}_1 = (EU)^{-1} G$, $\underline{m}_1 = VW^{-1}\underline{n}$, $R_1 = VW^{-1}BA^{-1}U = VJREU$ and D is the diagonal filter.

The transfer function matrix $R(\omega)$ of the uncontrolled system is $$R(\omega) = (-\omega^2 I + \Delta - \omega^2 \Phi^t L \Phi)^{-1} \quad (28)$$

If the modes of the system are unchanged by the addition of the aerodynamic damping then $\Phi^t L \Phi$ is diagonal and hence $R(\omega)$ is diagonal. If this is not the case then in general the system should be re-analysed in terms of the modes of the complete system, including aerodynamic damping and the controller. However as described earlier, it is observed that during flutter the modes are not much different from the structural modes, and therefore it is likely that the off-diagonal elements of $\Phi^t L \Phi$ are small. For simplicity we shall now assume that $\Phi^t L \Phi$ is diagonal, and we write $\omega_j^2$ for the j-th diagonal element of $\Delta$ and $l_j$ for the j-th diagonal element of $\Phi^t L \Phi$, to give the j-th element of $R(\omega)$ as $$R_j = \{-\omega^2 + \omega_j^2 - \omega^2 l_j(\omega)\}^{-1} \quad (29)$$

The j-th mode of the uncontrolled system will flutter when a pole of $R_j(\omega)$ lies in the upper half of the complex $\omega$-plane. For a diagonal controller, all of the matrices in (27) are diagonal, and the j-th diagonal element of $R_1$ is $R_j(\omega)$ if the system can measure the j-th mode.

From (27) the stability of the controlled system requires that the poles of $(1 - R_j d_j)^{-1} R_j$ all lie in the lower half of the complex $\omega$-plane. That is the zeros of $$[-\omega^2 + \omega_j^2 - \omega^2 l_j(\omega) - d_j(\omega)] \quad (30)$$

must lie in the lower half-plane

A condition that the forced response is not amplified is $$|(I - R_j d_j)^{-1} R_j| < 1, \text{ for all } \omega$$

or $$|-\omega^2 + \omega_j^2 - \omega^2 l_j(\omega) - d_j(\omega)| > 1. \quad (31)$$

A condition that the total noise is not amplified is $$\int d\omega |(I - R_j d_j)^{-1} R_j d_j|^2 < 1 \quad (32)$$

Thus the presence of noise introduces an additional constraint on our choice of controller. We also, of course, have the constraint that the controller must be causal. For the real system all of these conditions must be met simultaneously.

5.2 FORCED VIBRATION OF BLADES

Because flutter and forced vibration of rotor blades in turbomachines are allied phenomena, an active control system capable of controlling flutter will also be capable of controlling forced vibration in that the same combinations of sensors and actuators will be usable and in that there will be the same need for heterodyning, or equivalent digital processing steps, in the circumstances already detailed for flutter. However, in terms of what the control system must do to combat either or both of flutter and forced vibration, a distinction can be made. The distinction is that having eliminated a troublesome flutter mode in the ways already described—i.e. effectively by adding a small amount of active damping to the blade dynamic system—the control system may still have to add further active damping to counter a forced resonance which may arise due to the virtual lack of damping in the blade dynamic system after cancellation of the flutter.

5.3 SURGE AND ROTATING STALL

In this sub-section we first describe a model for the instabilities of a compression system, these instabilities being known as surge and rotating stall, and then go on to consider a simplified model problem that demonstrates the feasibility of active control of surge and rotating stall. All our modelling (excluding the active control systems suggested) is along the lines discussed in the papers by Greitzer and Moore, entitled "A theory of post-stall transients in axial compression systems", Parts 1 and 2, given at the ASME 30th International Gas Turbine Conference, at Houston, Tex. on Mar. 18th–21st 1985, Papers 85-GT-171,172. These papers should be consulted for further details.

Figure 3:
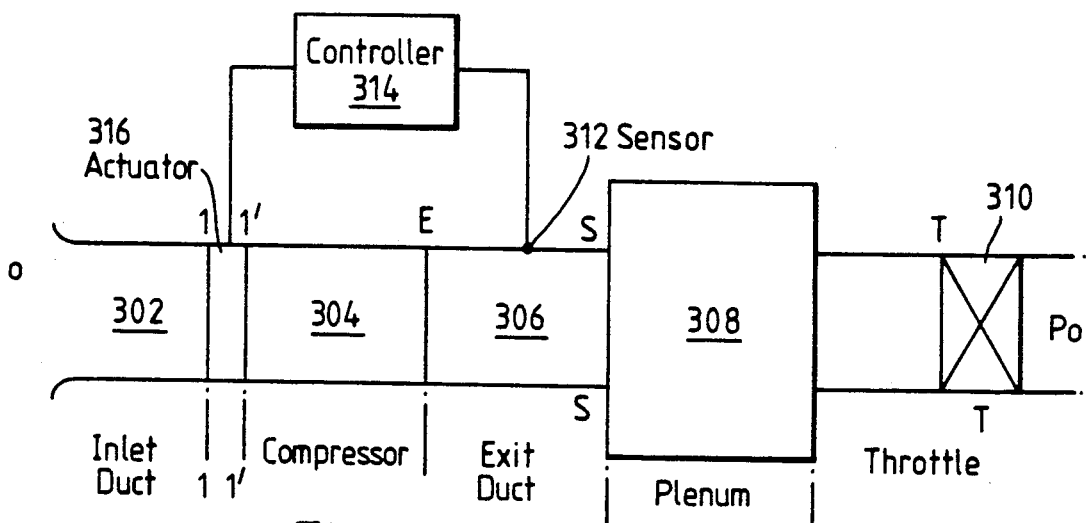
FIG. 3 is a diagrammatic representation of a layout for a compression system with an active control system adapted to control surge.

A generalised layout of a model of a compression system is shown in FIG. 3 and comprises an inlet duct 302, a compressor 304 and its exit duct 306, a plenum chamber 308, and a throttle 310 which controls the flow through the system. The diagram schematically illustrates a compression system such as would be used for rig test work in connection with testing of active control of surge and rotating stall. It should be noted that the plenum chamber 308 and the throttle 310 are conventionally considered equivalent to those components of a gas turbine engine which are downstream of the compressor.

In FIG. 3 the active control system to be tested is shown as comprising a sensor 312 downstream of the compressor 304, a controller 314 in which all the signal processing is carried out, and an actuator 316 situated just upstream of the compressor 304. Although the full theory of Greitzer and Moore allows for non-linear coupling between the two types of instabilities, we shall only consider the linear response of the system. The reasoning behind this is that if active control is to work it will keep the amplitudes sufficiently low for non-linear effects to be unimportant.

Control of Surge

We shall begin by considering pure surge, in which the motion of the gas is one-dimensional. It can be shown that the pressure perturbations are related to the perturbations in flow coefficient. The flow coefficient is the axial velocity of the gas divided by the blade speed U, as follows. For the inlet duct 302

$$\frac{-p_o' + p_1'}{\rho U^2} = -\Phi \phi_1' - l_I \frac{d\phi_1'}{d\xi}, \tag{33}$$

where $p_o'$ is the stagnation pressure perturbation at the inlet to the system and is assumed to drive the system in the absence of active control. $\Phi$ is the mean flow coefficient, $l_I$ is the length non-dimensionalised by the radius R, and $\xi$ is the non-dimensional time $\xi = Ut/R$. The compressor 304 is taken to have a steady flow pressure rise/flow coefficient relation $$\frac{p_E - p_1}{\rho U^2} = F^*(\Phi), \tag{34}$$

so that for small perturbations $$\frac{p_E' - p_1'}{\rho U^2} = F^{*'}(\Phi)\phi_1' - l_C \frac{d\phi_1'}{d\xi}, \tag{35}$$

where $l_C$ is a non-dimensional length that accounts for any time lag in the response of the compressor. The exist duct 306 will give the corresponding relation $$\frac{p_s' - p_E'}{\rho U^2} = -l_E \frac{d\phi_1'}{d\xi}. \tag{36}$$

Adding equations (33–36), we obtain the following relation $$\frac{p_s' - p_o'}{\rho U^2} = \left(F - L_C \frac{d}{d\xi}\right)\phi_1' \tag{37}$$

where $F = F^{*'}(\Phi) - \Phi$, $L_c = (l_I + l_C + l_E)$.

The system downstream of a basic compressor may be described by the following equations. For the plenum 308

$$\phi_1' - \phi_T' = 4B^2 L_c \frac{d}{d\xi} \frac{p_s'}{\rho U^2}, \tag{38}$$

where $$B^2 = \frac{V}{A_o L_c} \frac{U^2}{4a_o^2},$$

which is the non-dimensional Helmholtz resonator frequency of the system. Finally, the steady pressure drop across the throttle 310 is given by $$\frac{p_s - p_a}{\rho U^2} = \tfrac{1}{2} K_T \Phi^2, \tag{39}$$

so that linearising $$\frac{p_s'}{\rho U^2} = K_T \Phi \phi_T'. \tag{40}$$

Combining equations (40) and (38), we find that the plenum and throttle are described by $$\left(4B^2 L_c \frac{d}{d\xi} + \frac{1}{K_T \Phi}\right) \frac{p_s'}{\rho U^2} = \phi_1'. \tag{41}$$

We can now combine equations (37) and (41) to obtain the following equation for the complete system:

$$\left[\left(4B^2 L_c \frac{d}{d\xi} + \frac{1}{K_T \Phi}\right)\left(L_c \frac{d}{d\xi} - F\right) + 1\right]\phi_1' = \tag{42}$$

$$\left(4B^2 L_c \frac{d}{d\xi} + \frac{1}{K_T \Phi}\right) \frac{p_o'}{\rho U^2}.$$

We now assume a dependence of $\xi$, $\exp(i\Omega\xi)$, so that equation (42) becomes $$\left[-4B^2 L_c^2 \Omega^2 - i\Omega\left(4B^2 L_c F - \frac{L_c}{K_T \Phi}\right) + \right. \tag{43}$$

$$\left. \left(1 - \frac{F}{K_T \Phi}\right)\right]\phi_1' = \left(4B^2 L_c i\Omega + \frac{1}{K_T \Phi}\right)\frac{p_o'}{\rho U^2}.$$

It is clear that this system is unstable whenever $$F > \frac{1}{(4B^2 K_T \Phi)} \tag{44}$$

For a sufficiently steep throttle characteristic ($k_T \to \infty$) this shows that the system is unstable whenever the total static pressure rise/flow characteristics of the compressor has positive slope.

We shall now consider active control of surge. We will assume first, that the controlling element or actuator 316 is a variable nozzle guide vane that in effect exerts an axial force between stations 1 and 1' so that the inlet equation (33) then becomes $$\frac{-p_o' + p_1'}{\rho U^2} = -\Phi \phi_1' - l_I \frac{d}{d\xi} \phi_1' + f'(say). \tag{45}$$

We then obtain in place of equation (43)

$$\left[-4B^2 L_c^2 \Omega^2 - i\Omega\left(4B^2 L_c F - \frac{L_c}{K_T \Phi}\right) + \right. \tag{46}$$

$$\left. \left(1 - \frac{F}{K_T \Phi}\right)\right]\phi_1' = \left(4B^2 L_c i\Omega + \frac{1}{K_T \Phi}\right)\left(\frac{p_o'}{\rho U^2} + f'\right).$$

To demonstrate the possibility of active control, we shall suppose that f' is related to the value of $\phi_1'$ by means of a feedback law of form $$f' = -\alpha \phi_1', \tag{47}$$

which results in $$\left[-4B^2 L_c \Omega^2 - i\Omega\left(4B^2 L_c(F - \alpha) - \frac{L_c}{K_T \Phi}\right) + \right. \tag{48}$$

-continued $$\left(1 - \frac{(F - \alpha)}{K_T\Phi}\right)\right]\phi_1' = \left(4B^2L_c i\Omega + \frac{1}{K_T\Phi}\right)\frac{p_o'}{\rho U^2},\tag{48}$$

and we can see that the system in unstable whenever $$F > \alpha + \tfrac{1}{4}B^2 K_T\phi \tag{49}$$

Therefore our control has increased the value of the slope of the characteristic at which instability sets in.

Alternatively the controlling element might be provided by changes in the volume of the downstream plenum, e.g. in the space surrounding the combustion chamber in the case of an actual gas turbine engine, so that instead of (38) we have $$\phi_1' - \phi_4' = \frac{q}{U} + 4B^2 L_c \frac{d}{d\xi} \frac{p_s'}{\rho U^2} \tag{50}$$

Combining equations (50) and (40) we find that the plenum and throttle are described by $$\left(4B^2 L_c \frac{d}{d\xi} + \frac{1}{K_T\Phi}\right)\frac{p_s'}{\rho U^2} = \phi_1' - \frac{q}{U} \tag{51}$$

We can now combine equations (37) and (51) to give the following equation for the complete system (this time using p rather than $\phi$ as the independent variable)

$$\left[\left(L_c \frac{d}{d\xi} - F\right)\left(4B^2 L_c \frac{d}{d\xi} + \frac{1}{K_T\Phi}\right) + 1\right]\frac{p_s'}{\rho U^2} = \tag{52}$$

$$\frac{p_T'}{\rho U^2} + \left(L_c \frac{d}{d\xi} - F\right)\frac{q}{U}.$$

so that with a time dependence $\text{esp}(i\Omega\xi)$ $$\left[-4B^2 L_c^2 \Omega^2 - i\Omega\left(4B^2 L_c F - \frac{L_c}{K_T\Phi}\right) + \tag{53}\right.$$

$$\left.\left(1 - \frac{F}{K_T\Phi}\right)\right]\frac{p_s'}{\rho U^2} = \frac{p'}{\rho U^2} + (L_c i\Omega - F)\frac{q}{U}$$

To demonstrate the possibility of active control, we shall suppose that q/U is related to the value of the pressure $p_s'$ by means of a control law of form $$\frac{q}{U} = -\alpha \frac{p_s'}{\rho U^2} \tag{54}$$

which results in $$\left[-4B^2 L_c^2\Omega^2 - i\Omega\left(4B^2 L_c F - \frac{L_c}{K_T\Phi} - L_c\alpha\right) + \tag{55}\right.$$

$$\left.\left(1 - \frac{F}{K_T\Phi} - F\alpha\right)\right]\frac{p_s'}{\rho U^2} = \frac{p_o'}{\rho U^2}$$

and we can see that the system is unstable whenever $$F > \frac{1}{4B^2}\left(\alpha + \frac{1}{K_T\Phi}\right) \tag{56}$$

Our control has again increased the value of the slope of the characteristic at which instability sets in.

Control of Rotating Stall

We shall now consider the control of rotating stall. The analysis, again based on that of Greitzer and Moore, proceeds along similar lines to that for surge, but differs in a number of respects.

The relation for the inlet duct becomes $$\frac{-p_o' + p_1'}{\rho U^2} = -\Phi\phi_1' - \frac{\partial\widetilde{\phi}}{\partial\xi}, \tag{57}$$

where $\widetilde{\phi}$ is the velocity potential of the unsteady flow. The pressure rise/flow characteristic of the compressor becomes $$\frac{p_s' - p_1'}{\rho U^2} = F^{*\prime}(\Phi)\phi_1' - \frac{1}{a}\left(\frac{\partial\phi_1'}{\partial\xi} + \frac{1}{2}\frac{\partial\phi_1'}{\partial\theta}\right) \tag{58}$$

in which the quantity "a" represents the inherent time lag of the compressor response, and the $\delta\phi_1'/\delta\theta$ term arises from the rotation of the rotor blades (see Greitzer and Moore). The exit duct will be taken to have the response $$\frac{p_s'}{\rho U^2} = (m - 1)\frac{\partial\widetilde{\phi}}{\partial\xi}. \tag{59}$$

We now consider a particular mode of the unsteady flow, such that all quantities have the spatial form $$exp(i\Omega\xi - in\theta), \tag{60}$$

Then the potential will have the following form ahead of the compressor $$\widetilde{\phi} = \widetilde{\phi}exp(i\Omega\xi - in\theta + n\eta), \tag{61}$$

where $\eta$ is the axial distance scaled on radius. Adding equations (57-59), with $F = (F^{*\prime}(\Phi) - \Phi)$, $$-\frac{p_T'}{\rho U^2} = F\phi_1' - \frac{1}{a}\left(\frac{\partial\phi_1'}{\partial\xi} + \tfrac{1}{2}\frac{\partial\phi_1'}{\partial\theta}\right) - m\frac{\partial\widetilde{\phi}}{\partial\xi}, \tag{62}$$

and it follows that $$\left(\frac{1}{a}\left\{1 + \frac{am}{n}\right\}i\Omega - \left\{F + \frac{in}{2a}\right\}\right)\phi_1' \frac{p_o'}{\rho U^2} \tag{63}$$

so that the system will be unstable whenever $F > 0$. At that condition, we find that $$\frac{\Omega}{n} = \tfrac{1}{2}\left(1 + \frac{am}{n}\right)^{-1}, \tag{64}$$

so that the rotating stall disturbance rotates around the compressor at slightly less than half the rotational speed.

We now consider active control and again suppose that our controller acts so as to produce an axial force at the inlet to the compressor such that equation (63) then becomes $$\left[\frac{1}{a}\left(1+\frac{am}{n}\right)i\Omega - \left(F+\frac{in}{2a}\right)\right]\phi_1' = \frac{p_0'}{\rho U^2} + f. \quad (65)$$

Again we suppose that f is related to $\phi_1'$ via equation (47), to obtain $$\left[\frac{1}{a}\left(1+\frac{am}{n}\right)i\Omega - \left(F-\alpha+\frac{in}{2a}\right)\right]\phi_1' = \frac{p_0'}{\rho U^2}. \quad (66)$$

The system is again stabilised for positive $\alpha$. It should be noted that the stability for this simple example is not a function of the mode number n, but that need not be so in the more complicated general case. We should also note that in both this case and the surge control case, we could, instead of the force f, due to variable guide vanes, use a mass flow that could be provided by sources on the wall, such as jets of air issuing from nozzles. Instead of the velocity $\phi_1'$, we could have also used the pressure p' as a controlling variable.

Similarities to Control of Flutter

To compare the control of surge and rotating stall with the control of flutter, it will be useful to note that we can arrange the above results in matrix form. Thus the response of the compressor and the inlet could be described by $$\underline{L}(\omega)\phi' = \underline{f}^{(1)} + (\underline{I} + \underline{\alpha}')\underline{f}^{(2)}. \quad (67)$$

Figure 4:
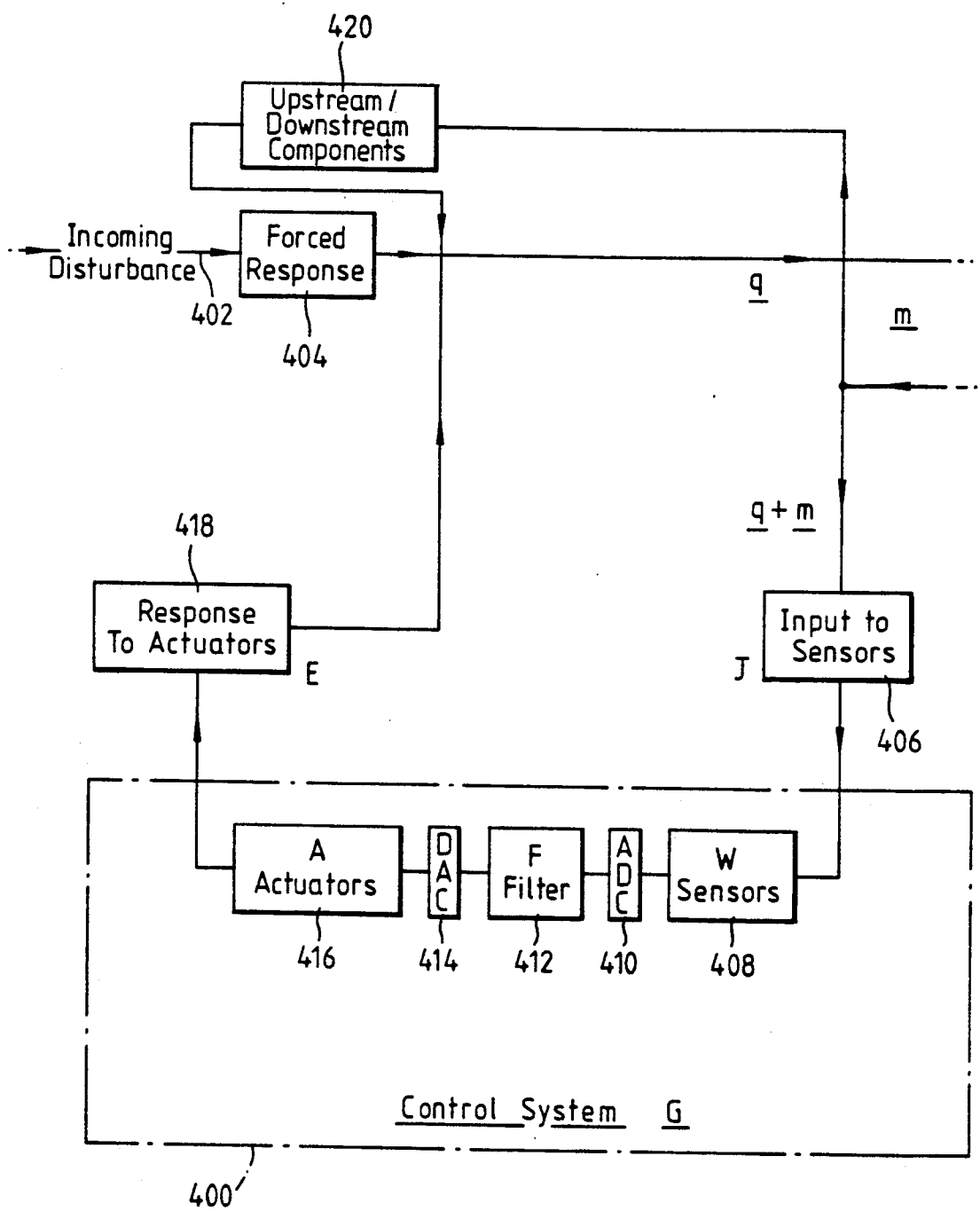
FIG. 4 is a block diagram similar to FIG. 1 but referring to surge and rotating stall rather than flutter.

Here $L(\omega)$ is the response of the compressor, $f^{(1)}$ the driving force and $f^{(2)}$ the response of the downstream flow (the plenum and the throttle on a rest rig, or the rest of the engine on a complete engine). Noting that $f^{(2)}$ can be related to the flow $\phi'$, it is easy to see that we can follow the analysis through in a similar manner to that done for flutter. Consequently we see that FIG. 4 closely follows the content of FIG. 1 in illustrating the coupling between the compressor system and the inputs and outputs of an active control system 400.

The diagram shows that an incoming disturbance 402, such as a pressure field, produces a forced response 404 of the compressor components. This in turn results in flow fluctuations q. The input 406 to the array of pressure sensors 408 comprises both the noise component m and the flow fluctuations q. As explained in relation to FIGS. 1 and 2, the sensors 408 and actuators 416 may have associated signal processors to compensate for non-linear response. However, no heterodyning steps are necessary. The corrected sensor signals are then digitized in ADC 410 and input to a digital mutlti-channel filter 412, whose output signals are converted to analogue form in DAC 414 and used to drive oscillating stator vanes comprising the actuator array 416, again after correction in associated signal processors. The compressor components have a response 418 to the outputs of the actuator array. This response 418, together with feedback 420 received from upstream and-/or downstream components, acts to at least partly counter the response 404 forced by the incoming disturbance 402.

System Design Differences between Control of Surge and Rotating Stall

Additional explanatory notes are in order concerning the implications for the design of active control systems of the differences between surge and rotating stall.

As has been explained previously, surge for our purposes is essentially axisymmetric, can usually be assumed to be unimodal, and does not rotate with the rotor blades. Therefore, because the disturbances characterising surge are not in the blade frame of reference, a control system adapted merely to control surge will not need to include heterodyning stages or their equivalents - provided of course that the sensors, actuators and signal processing stages used are also not in the blade frame of reference. Furthermore, as has already been mentioned, it is conceivable that surge, because of its unimodal nature, may be controlable with a simple control system comprising, at the least, one sensor, one actuator and one signal processing channel.

On the other hand, rotating stall is a multimode pheonomenon, i.e. there may be more than one mode of rotating stall present in a turbocompressor rotor assembly, and therefore a multi-channel control system will be required to control it, with several to many sensors and actuators.

In general, the same types of sensors and actuators could be used in control systems for rotating stall as in control systems for surge, and of course it is likely that the same control system would be utilised to control both pheomenon, especially in view of the fact that although rotating stall comprises rotating modes, they do not rotate with the blade frame of reference or in a perfectly fixed relationship to it, and therefore there is no point in including heterodyning stages or their equivalents in the control system, provided of course that the sensors, actuators and signal processing stages used are not in the blade frame of reference. In fact, the rotating stall cells rotate at approximately half the rotor blade speed, but this relationship is somewhat variable.

Although it has been stated above that the same types of sensors and actuators are in general suitable for use in controlling both surge and stall, this statement requires qualification. For instance, in the case of a gas turbine engine it may be thought desirable to control surge in the compressor indirectly by continuously modulating the fuel flow rate to a combustor downstream of the compressor, e.g. by means of a electromagnetically driven diaphragm in a chamber communicating with a fuel pipe. However, such an actuator would not be suitable for controlling rotating stall modes because its effect on the flow through the compressor rotor would not be sufficiently selective. Furthermore, though a ring of variable stator vanes upstream of the compressor could be kept in continuous motion by the active control system in order to modulate the flow through the compressor and thereby counter both surge and rotating stall, and movement of the ,vanes in unison with each other would be sufficient to counter surge, assuming it is unimodal, nevertheless to control rotating stall with the same vanes would require the control system to differentially weight the actuator control signals as discussed in relation to control of flutter so that the stator vanes would be moved by different amounts at the same time at different angular locations in the ring in order to produce disturbances in the flow which would arrive at the correct angular location on the rotor to counter the rotating stall.

5.4 ACOUSTIC RESONANCE

Control systems for the control of acoustic resonance will be similar to those required for the control of rotating stall in that acoustic resonance comprises rotating acoustic disturbances which are not tied to the blade frame of reference. However, they usually rotate faster than rotating stall cells. A further similarity is that acoustic resonance is a multimode phenomenon. Hence, an active control system for acoustic resonance requires multi-channel signal processing, and arrays of sensors and actuators comprising several to many sensors or actuators, the control system acting to isolate sensor signals representing conditions in the rotating acoustic disturbances and apply active "damping" to the disturbances through the actuators.

As for the rotating stall case, the preferred sensors would be pressure transducers located in the casing surrounding the turbocompressor, or in a downstream plenum (near the combustion chamber in the case of a gas turbine engine) and the preferred actuators would be loudspeakers similarly located in the surrounding casing or in a downstream plenum. Alternatively, again as in the case of rotating stall, the actuators could be variable stator vanes situated just upstream or downstream of the compressor.

5.5 STATE-SPACE CONTROL

Taking the specific example of control of flutter of fan blades in a turbofan aeroengine, we will now show how an active control system for this task can be defined using modern state-space control theory. The approach is not different in principle from that described above, since the objective of minimising the disturbance (eg: blade vibration, surging or stalling) with a minimum amount of control effort is still achieved. However, some of the details, and in particular the method of dealing with the changes of frames of reference are different and are thus described lest our claims for the present invention be unnecessarily restricted in scope.

The control of flutter by a state-space system is given by way of an example and the technique is equally applicable to the control of forced vibration, acoustic resonance, surge and rotating stall. A digital control system is envisaged for the reasons of robustness and reliability.

The fan blade system to be controlled is a distributed parameter system and so there are no obvious system coordinates which can be used to define the 'states' (In standard state-space control theory the disturbance to be controlled is normally characterised in terms of, say, the displacement of a point away from the ideal controlled position. In a multi-element system then the displacements of each point constitutes one of the state-space coordinates. Further, if the control is digital then, in addition to the current displacement, the displacement at a few past sampling instants are normally coordinates of the state-space. Where the system under control is, as here, a spatially (and temporally) continuous system then the particular points chosen for the system coordinates are not obvious). However, for the purposes of this problem, the frequency bandwidth of interest is limited and consequently the blade wavenumbers are also limited. Therefore the motion of a selected discrete set of points on the blades will be sufficient to prescribe the dynamics of the whole blade: the motion of the rest of the blade being inferred from the motion at these discrete points.

Equally well the local strain measured at discrete points on the blades will be sufficient to prescribe the strain on the whole blade set. In either of these cases the direct displacement or strain constitutes the state of the system.

In a preceeding section relating to diagonalisation of the controller, it was emphasised that the control system may be simplified if individual modes can be 'measured'. This would correspond to taking the individual point strains $\epsilon$ and recognising that they were measured by sensors which have a particular characteristic $W$, giving the sensor signals as $W\epsilon$. A compensation element of the control system would compensate for these sensor characteristics with a filter for each sensor as described in relation to FIG. 2. This would be represented by the diagonal Matrix $\hat{W}^{-1}$. The output of these filters would be the estimate of the actual strains. The outputs of these filters would be fed to weighting networks (described by the matrix $V$ previously) whose output would be related to the individual modes of vibration of the blades. (Here modes are each of the combined blade disc modes for each of the individual blade mode types, i.e.: first flap, second flap, third flap, first torsion, etc).

Finally these modal outputs $$V\hat{W}^{-1}W\epsilon$$

could alternatively be used as estimates of the system state-space coordinates. The discussion will proceed assuming that this prefiltering is used.

Each mode can be described by a differential equation in the modal coordinate. This differential equation appears as a difference equation when cast in discrete time. We will consider the aerodynamic forcing to be part of the system dynamics as is shown in equation (14). The forcing term in the equation will be composed of the incoming disturbance and the effect of the control actuators. In state-space this equation is $$x(i+1) = A\,x(i) + Bu(i) + \xi(i) \tag{68}$$

where: x is a vector with n components $x_1 \ldots x_n$, where n is the order of the dynamic system (These represent the states of the system; for multi-mode systems n is the sum of the orders of each of the modes and x would be a partitioned vector, each partition corresponding to one mode. Here we have defined the states as $x \triangleq V\epsilon$).

u is a vector with m components, representing up to m separate inputs;

A and B are matrices of order n x n and n x m respectively;

$\xi$ is a vector with n components representing the disturbances that affect the states of the system.

The eigenvalues of matrix A are the roots of the characteristic differential equation governing the system. By setting the disturbance and the control to zero and seeking the general solution $$x(i) = x(0)\lambda^i$$

we find $$\lambda x(0) = A\,x(0) \tag{69}$$

We are not able to measure the states of the system explicitly and we represent the outputs that we can measure as y, $$y(i) = \hat{W}^{-1} W x(i) + \xi_2(i) \qquad (70)$$

re-writing $\hat{W}^{-1}W$ as C to conform to the standard state-space notation then $$y(i) = Cx(i) + \xi_2(i) \qquad (71)$$

where y is a vector with p components representing the measurements or outputs;

x is the state vector;

C is a p×n matric relating the measurements to the states; $\xi_2$ is a vector representing the uncertainty in the measurements due to noise neither related to the system under control nor to the disturbance.

Figure 5:
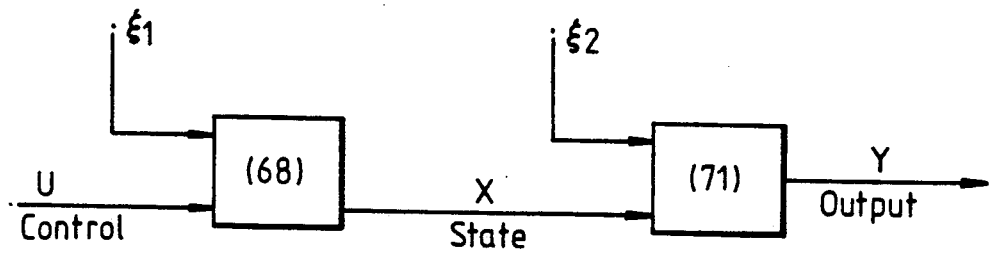
FIG. 5 is a representation of a state-space control system for controlling fan-blade flutter.

FIG. 5 is the state-space representation showing equations (68) and (71) as boxes in the diagram.

The performance criterion H that we should use will be the minimisation of the infinite sum of $$H(i) = x'Px + u'Qu \qquad (72)$$

where P and Q are weighting matrices which represent the relative costs of the departure of the state from the origin on one hand and of control on the other hand. These matrices will be chosen to measure some function of the stress in the blade (for example higher frequencies can be weighted more severely to take the effects of fatigue into account),.and to measure the amplitude of the control that is applied since this must be bounded. Both of these matrices would be chosen once the details of the system and its control were fixed.

Suppose that the control actuators are positioned in the casing frame of reference and, in this case, the effect of this can be taken into account in a different but related manner to that described above as hetrodyning. Specifically, the time varying effect of the controls on the system can be taken into account in equation (68) by introducing time variation into the matrix B. Equation (68) becomes $$x(i+1) = Ax(i) + B(i)u(i) + \xi_1(i) \qquad (73)$$

The controller gains, K(i), would be calculated using optimal stochastic LQP -control theory as explained by Tou in "Optimum design of digital control systems", Academic Press 1963:

$$u(i) = -K(i)x(i) \qquad (74)$$

In this theory the gains are calculated by solving a matrix Riccati difference equation. The Ks are given by $$K(i) = \{Q(i) + B'(i)V_{i+1}B(i)\}^{-1}B'(i)V_{i+1}A \qquad (75)$$

The matrix $V_i$ is given by the equation $$V_i = P + A'V_{i+1}A - A'V_{i+1}B(i)\{Q(i) + B'(i)V_{i+1}B'(i)\}^{-1}B(i)V_{i+1}A \qquad (76)$$

which is solved, working backward in time, from a fixed value of V=P.

Time variation to the control cost matrix is included so that during the periods when the actuators have very little influence on the system the cost can be set higher. This will limit unnecessary wear on the actuators. This difference equation would be run for many periods (engine performance cycles) until the transient behaviour decays and the periodically varying part becomes clear. This periodic solution for V will then give the controller gains in conjunction with equation (75).

The controller gains, K, of equation (74) operate on the state, x, however it was mentioned previously that these are not available directly. In general the state is estimated from these measurements, y, using standard state estimation techniques as set forth by Tou in the above-mentioned reference. In that state estimation procedure knowledge of the matrix C is used.

In this case when the sensors are on the casing frame of reference then the matric C of equation (71) is time varying and this effect can be taken into account explicitly in the estimation of the state.

It can now be seen clearly how the controller gains K can be calculated from measurements of the system parameters A,B and C, the statistics of the noise processes $\xi_1$ and $\xi_2$, which can also be measured, and the cost matrices P and Q.

Apart from P and Q, which are defined, a-priori parameters would be measured initially or estimated online in a self-tuning algorithm using well known techniques as set forth by Lee in "Optimal estimation, identification and control", MIT Press 1964.

5.6 INSTALLATION OF ACTIVE CONTROL SYSTEMS IN GAS TURBINE AEROENGINES

FIGS. 6 to 16 are diagrams showing various possibilities for how active control systems for control of blade flutter, forced vibration, surge and rotating stall and acoustic resonance could be installed in gas turbine aeroengines. It should be noted that as for any advanced electronic control system in the aerospace field, safety and reliability requirements-involving the usual component redundancy, duplication of control paths, and provision for the control system to monitor its own operation—should be taken into account whem designing the system for installation.

Where the Figures comprise A and B portions, the A portions represent sectional side views of an aeroengine and the B portions represent composite sectional front views of the aeroengines.

Flutter and Forced Vibration

Referring now to FIGS. 6 to 13, FIG. 6 shows a turbofan aeroengine 600 having a front fan 602 surrounded by a fan casing and nacelle 604. The fan 602 is provided with outlet guide vanes 606 which also act as struts between the fan casing 604 and the core engine compressor 608, which has inlet guide vanes 610. In order to combat flutter or forced vibration in the blades of the fan 602, the turbofan 600 is provided with an active control system, all elements of which are contained within the fan casing 604 and comprise an array of sensors 612, an electronic controller 614, and an array of actuators 616.

In FIG. 6, the array of sensors 612 comprises two axially spaced rows of sensors 618, and 620 respectively, each row extending circumferentially all the way round the fan casing interior surface with the sensors being equiangularly spaced with respect to each other. One row of sensors 618 is situated near the leading edges of the tips of the fan blades and the other row 620 is situated near their trailing edges. Such an arrangement enables flap and torsional vibrational modes to be more easily distinguished. These sensors may comprise pressure transducers sensing the pressure fluctuations at the wall of the fan duct casing 604 immediately adjacent the tips of the fan blades 602 as they pass. If a blade is fluttering or otherwise vibrating, this will manifest as irregularities in the pattern of the signals received by the controller 614 from the sensors.

One type of pressure transducer useable as a sensor for the present invention is the piezoelectric type for sensing the aerodynamic pressure level. Another suitable type would comprise mircophones for sensing the sound pressure level.

An alternative to the use of pressure transducers for sensing flutter or forced vibrations would be electrocapacitive or electromagnetic method of detecting fan blade tip position, using electrodes or magnets mounted in the tips of the fan blades in order to produce varying emf's in wire loops mounted in the casing. The rise and fall of these emf's in the wires would vary with the flutter or other motions. This method of sensing vibration is already known, e.g. from British Patent No. 1009979.

The array of actuators 616 comprises a single row of loudspeakers or similar moving diaphragm devices arranged to produce a variable pressure and velocity field in the flow upstream of the fan blades 602 near the intake of the fan. The loudspeaker diaphragms may either form part of the casing wall or communicate with the fan inlet via apertures in the casing.

The controller 614 incorporates all necessary signal processing as discussed previously.

Turning now to FIG. 7, showing a turbofan as in FIG. 6, the actuators 716 remain as in FIG. 6 and will not be described again. However, the sensor array 712 is on the fan blades 702 and comprises three radially spaced rows of sensors 718, 720 and 722. Again, this arrangement enables the various vibrational modes to be distinguished. The sensors may for example, be thin film gauges, strain gauges or piezoelectric elements mounted on the blades to monitor their deflection. In order to transfer the sensor signals to the controller 714, which is mounted in the fan casing 704 as in FIG. 6, it is necessary to utilise a small telemetry unit T in the fan rotor 724 to receive signals from the sensor array 712 and transmit them by optical or radio means to a receiver R in static structure of the engine. The signals are then passed to the controller 714 through compressor inlet guide vanes 710 and fan outlet guide vanes 706, which are also static.

As an alternative to the use of strain gauges or the like to measure deflection on the fan blades 702, the sensor array 712 could utilise blade-mounted pressure gauges, similar to those in the array 612 in FIG. 6, which would provide an indirect measure of the blade motion.

FIG. 8 shows an arrangement in which the sensor array 812 comprises two rows of sensors 818 and 820 mounted in the fan casing 804, together with the controller 814, but in which the actuator array 816 is on the fan blades 802. In this case the sensors 812 may once again be pressure transducers, but the actuators 816 are variable angle flaps 817 on the trailing edges of the fan blades 802. These flaps 817 are driven by drive elements 819 receiving control signals through the telemetry sending and receiving units T and R respectively as described for FIG. 7, but with the sending unit T housed in static structure and the receiving unit R housed in the fan rotor 824. The drive elements 819 may conveniently be solenoid-operated linkages or small stepper motors or the like mounted inside the fan blades 802 which are of hollow honeycomb interior construction as known in the aeroengine industry. The controller 814, acting on the information provided by the sensor array 812, keeps the flaps 819 in substantially continuous oscillatory motion in order to combat the flutter modes and enable continued operation of the turbofan in a regime which without the control system would not have been possible.

FIG. 9 shows a system in which both the sensor array 912 (similar to array 712 in FIG. 7) and the actuator array 916 (similar to array 816 in FIG. 8) are on the fan blades 902, the control unit 914 also being mounted within the rotor 924 and rotating with it. Power may be fed to the control unit 914 and drives 919 by a slip-ring or commutator arrangement. This eliminates the need for the telemetry units mentioned in connection with FIGS. 7 and 8. An advantage of this arrangement for the control of blade flutter is that the system would work equally well if the fan casing 904 were absent, such as would be the case for a turboprop or propfan type of aeroengine.

FIG. 9 also illustrates an arrangement in which the actuator array 916, rather than comprising oscillating flaps 917 and drive units 919, comprises instead strips of piezoelectric material 930 (shown in dashed lines) secured to the inside surfaces of the hollow fan blades 902. The piezoelectric strips act as transducers which receive electrical signals from the controller 914 and deliver corresponding mechanical forces to the blades 902 in order to counter the troublesome flutter or vibration mode or modes by varying the blades' stiffness in order to increase structural damping.

The arrangement shown in FIG. 10 again has an array of sensors (not shown) on the fan blade or propeller 1002 and a control unit (again not shown) which is housed in the rotor 1024. Blade flutter or forced vibration is controlled by means of drive elements 1019 and actuators 1016 which vary the pitch of the rotor blades 1002 appropriately. Suitable variable pitch control mechanisms are known in the industry. The fan casing 1004, if present, may of course be used to house the sensors and/or the controller if this is desired.

FIG. 11 shows an arrangement for active control of flutter in a compressor 1102, in which a set of compressor rotor blades 1104 are mounted on a rotor disc 1106 driven by a shaft 1108. The compressor rotor blades 1104 are subject to flutter and forced vibration and are provided with an array of sensors 1110, the sensor signals being passed to a telemetry transmission unit T mounted on the front of the compressor rotor disc 1106 for transmission to a controller 1112, which also incorporates a telemtry receiving unit, the controller 1112 being mounted on adjacent static structure. Control signals from controller 1112 are used to vary the angles of a set of variable inlet guide vanes 1114 which are driven through drive units/actuators 1116.

FIG. 12 shows a further alternative arrangement for active control of flutter in a compressor 1202 which is structurally similar to that shown in FIG. 11, except that the variable inlet guide vanes 1114 have been replaced by fixed guide vanes 1214. These are hollow and are provided with nozzles or apertures 1215 in their trailing edges. An array of sensors 1210 is mounted in the compressor casing 1211 and comprises pressure transducers sensing pressure fluctuations near the tips of the compressor rotor blades 1204, which are subject to flutter or forced vibration. Sensor signals are passed to the controller 1212 and the control signals are used to drive an actuator array comprising electrically-operated valves 216 which control a supply of high pressure compressed air 1217 (or other fluid) to each hollow guide vane 1214. The valves 1216 operate rapidly to release puffs of compressed air into the hollow guide vanes 1214 and thence through the apertures 1215 as pulsed jets into the flow through the compressor. These modulated jets of air introduce momentum or density perturbations into the main flow, the perturbations being controlled to act counter to the perturbations associated with the flutter.

FIG. 13 shows a scrap view of an alternative arrangement for introducing momentum or density perturbations into the main flow past the compressor rotor blades 1304, in which the hollow inlet guide vanes 1214 of FIG. 12 are replaced by conventional inlet guide vanes 1314 and rather than injecting air or other fluid into the flow, some of the main flow is removed from the compressor downstream of the rotor blades through an array of compressor variable bleed valves 1316 which are solenoid-operated and controlled to open and close rapidly by the controller 1312., The sensor array 1310 is similar to the array 1210 in FIG. 12.

A further alternative actuator means for introducing perturbations into the flow, but which is not shown in the drawings, comprises an array of heat injectors, which could be in the form of electrical discharges between electrodes, or lasers discharged into the flow through the compressor upstream of the rotor blades, or hot gases bled from the turbine.

Figure 17:
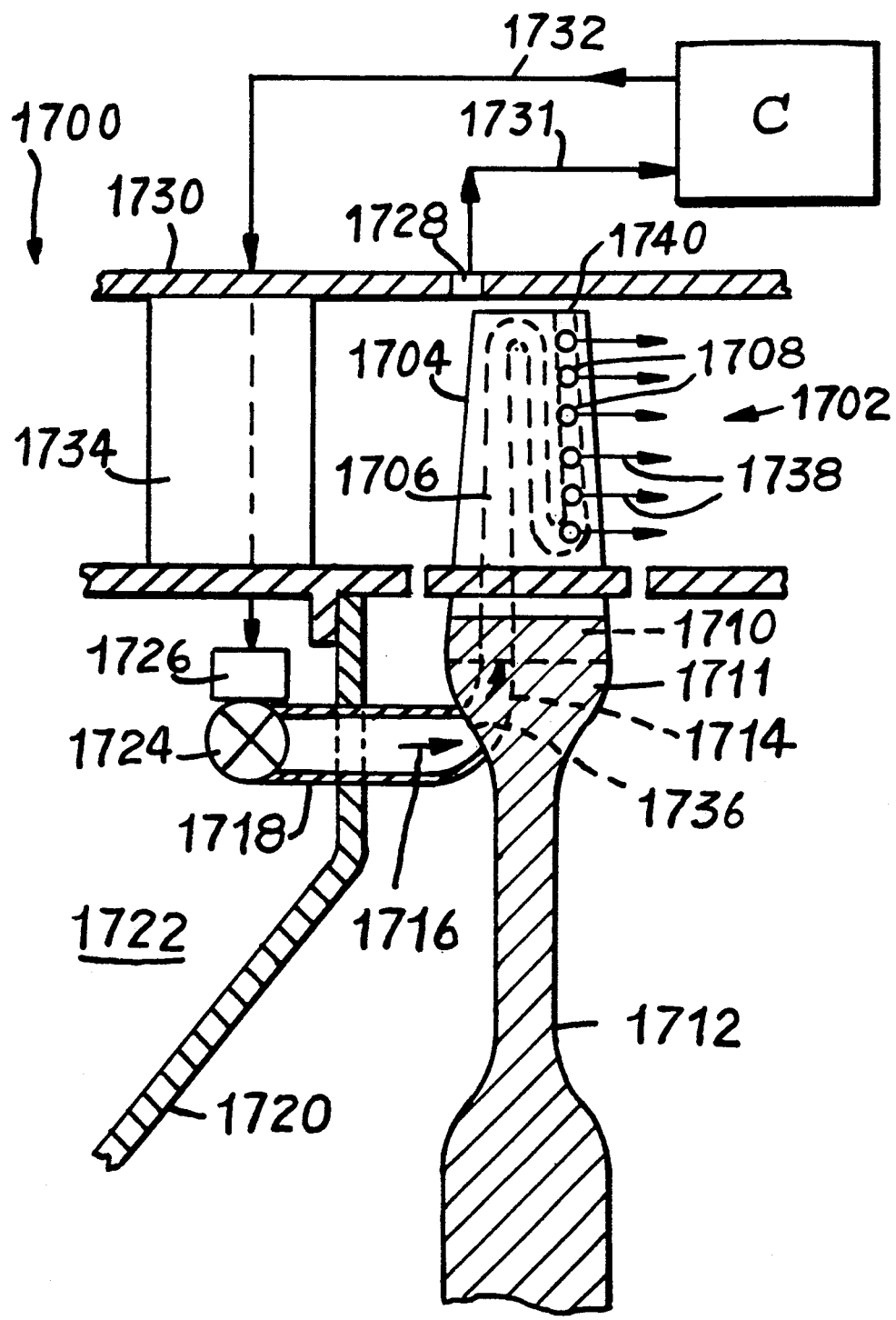

Moving on to FIG. 17, there is shown a part-sectional side elevation of the high pressure turbine 1702 of a gas turbine engine 1700. The sketch shows one of a set of film cooled turbine blades 1704 having an interior sinuous cooling air passage 1706 which feeds a row of film cooling holes 1708 extending spanwise of its flank near its trailing edge. The cooling arrangement is exemplary only and in practice each blade would likely have many more holes distributed over its surface. Furthermore, each row of holes 1708 could be replaced by a single equivalent slot formed in the surface of the blade, the slot being fed by metering holes from the passage 1706 in the interior of the blade 1704.

The blades 1704 have root portions 1710 which are retained in the rim 1711 of the turbine disc 1712. Both the root portions 1710 of the blades and the rim 1711 of the disc 1712 have matching cooling passages 1714, which are fed with preswirled cooling air 1716 from a number of preswirl nozzles 1718 provided on static structure 1720 adjacent the forward face of the disc 1712. The air in chamber 1722 forward of the static structure 1720 is pressurised, being bled from the compressor (not shown) of the engine.

The preswirl nozzles 1718 are equi-angularly spaced apart around the static structure 1720 at a common radius with respect to the turbine's axis of rotation, and each one (or at least some of them) are provided with a valve 1724 and a control servo 1726 in order that the cooling air mass flow through the nozzles can be modulated with a rapid on/off action.

In operation, an array of acoustic pressure sensors 1728, spaced around the circumference of the turbine rotor in the turbine casing 1730, senses frequencies associated with forced vibrations of the turbine blades as they go past, the controller C filtering the signals 1731 from sensors 1728 to extract the modes of vibration which if not controlled would result, e.g., in fretting of the blade roots 1710 against the disc rim 1711, or which would otherwise be troublesome. These signals are further processed in the controller C as previously described to produce control signals 1732 which are passed to the servos 1726 via a nozzle guide vane assembly 1734 upstream of the turbine rotor. In accordance with the control signals 1732 the servos 1726 modulate the mass flow rates of the cooling air flowing through the preswirl nozzles 1718, thereby modulating the amount of cooling air entering the passages 1714 via the apertures 1736 under disc rim 1711, and hence also modulating the amount of spent cooling air 1738 escaping from the film holes 1708 and also from an exhaust hole 1740 in the tip of the blade at the end of the sinuous passage 1706. The resulting local perturbations of the flow past the rotor blades act to damp the troublesome vibratory mode(s) and the array of actuators 1724,1726 in response to control signals 1732 continuously adjust the modulation frequency of the cooling air flow to maintain control and avoid exciting alternative vibration modes whilst providing adequate cooling air flow to the rotor blades.

Surge and Rotating Stall

Turning now to FIGS. 14 to 16, FIG. 14 shows part of a gas turbine aeroengine comprising a compressor 1402 and an annular combustor 1404 downstream thereof receiving compressed air therefrom for combustion with fuel which is passed to the combustion chamber 1404 via an array of fuel pipes 1406. The fuel pipes receive fuel from the fuel control system (not shown) of the engine via a fuel manifold 1408. The compressor 1402 has three stages of compressor rotor blades 1410 on a common rotor drum 1412, each rotor blade stage having associated stator blades 1414. The compressor 1402 also has inlet guide vanes 1416.

In order to combat surge and rotating stall in the compressor 1402, it is provided with an active control system in which compressor surge or rotating stall is sensed by means of an array of sensors 1418 comprising two axially spaced circumferentially extending rows of pressure transducers 1420,1422 near the discharge end of the compressor. The surge or rotating stall is corrected by means of a circumferential array of actuators comprising loudspeakers 1424 or the like near the inlet of the compressor, both the actuators and the sensors, and also the controller 1426, being mounted in the wall of the compressor casing 1428.

FIG. 15 shows an alternative arrangement for the actuator part of the system only in which the actuator array comprises a set of variable inlet guide vanes 1516.

No further description of the two control systems shown in FIGS. 14 and 15 is required in view of the similarities of these control systems with those shown earlier for flutter control. However, reference should be made to FIG. 16, in which an alternative form of actuator for combating surge only is shown.

In FIG. 16, there is shown a modified part of the structure of FIG. 14, namely part of the fuel system comprising the fuel nozzles 1602 in the combustion chamber 1604 and the fuel supply pipes 1606 which supply fuel to the nozzles from the manifold 160. It will be seen that the manifold 1608 is connected to an actuator 1610 comprising a chamber 1612, one wall of which consists of an electromagnetically actuated diaphragm 1613, which when driven by input signals 1614 from a controller (not shown) modulates the fuel flows to the nozzles in order to combat surge, the necessary sensors (not shown) in the control system being similar to those of FIG. 14. If necessary for substantially simultaneous modulation of fuel flow to all the nozzles, there may be two or more actuators 1610 equiangularly spaced around the fuel manifold 1608. It should be noted that a modulation of the fuel flow could also be achieved using, e.g. an electromagnetically actuated piston instead of a diaphragm, or an electromagnetically actuated valve arranged to partially obturate the fuel flow upon command from the controller.

Further explanation concerning the use of sensors and actuators in control systems according to the invention will be of value.

Regarding sensors, these can be divided into means for detecting blade motion and means for detecting flow changes. Examples of the former are blade mounted strain gauges, which monitor the deflection of the blades and thus their vibration; blade mounted pressure transducers, which only indirectly sense the blade motion; and electromagnetic or capacitative methods of detecting blade tip position. Examples of the latter are pressure transducers mounted on rotor blades, stators or casings, or any other part of the turbomachine where the relevant instability can be measured easily; and hot film or hot wire sensors, not mentioned previously, which would detect flow instabilities by their cooling effects on the wire or film.

Regarding actuators, these can be divided into: (1) means for introducing local perturbation of the flow through the turbomachine about its means value; (2) means for introducing an overall perturbation of the mean flow; (3) means for controlling blade vibration which involve direct contact with the blades; and (4) means for applying forces to the blades from a distance. Taking these in turn:

(1) These can be divided into six categories:
 (i) Variable angle stator vanes and guide vanes or variable angle flaps on stator vanes, guide vanes or rotor blades. These alter the mean flow direction and thus perturb the flow. They may also introduce a fluctuating drag on the flow which would create a fluctuating momentum deficit.
 (ii) Other variable lifting surfaces situated in the main flow. These alter the vorticity distribution in the flow.
 (iii) Casing mounted loudspeakers and the like which introduce pressure and velocity fluctuations in the main flow.
 (iv) Flow injectors which introduce modulated jets into the flow. These jets could be at different conditions of temperature or density or a different fluid from the main flow. These devices introduce a momentum or density perturbation into the main flow. In the case of film cooled turbine blades, flutter or vibration could be countered by modulating the flow rate or density of cooling air or other cooling fluid as it flows into the blades, thereby modulating the flows out of the blade surfaces.
 (v) Heat injectors such as electrical or laser discharges, which perturb the local density of the main fluid flow.
 (vi) Variable bleed valves which introduce a perturbation into the flow momentum by allowing fluid to leave the main flow through the engine.

(2) These can be divided into two categories:
 (i) means for altering the fuel burning rate in the engine such as the electromagnetically driven diaphragms already mentioned.
 (ii) means for bleeding compressor delivery air flow from the space surrounding the combustion chamber, such as a valve-controlled connection to a location at lower pressure.

(3) Two categories involve direct contact with the blades for control of blade flutter and vibration:
 (i) electromagnetically actuated shakers attached to the blades which induce forces in the blades.
 (ii) piezoelectric or magnetostrictive means internal of the blades to deform them by changing the relevant chracteristics of such means, for example embedded piezoelectric crystals which could distort the blade and thereby affect the local structural properties of the blades, e.g. by increasing the structural damping.

(4) It would be possible to exert electromagnetic forces on rotor blades to counter flutter, etc, by providing magnets on the blades and controlling currents flowing through wires in the casing, or vice-versa.

We claim:

1. In a turbomachine, a control system for actively controlling the dynamics of at least one mode of at least one unsteady motion phenomenon associated with the blading of said turbomachine, said control system having a control bandwidth which is at least partly coextensive with the bandwidth of said unsteady motion phenomenon and comprising:
 (a) an array of sensors located in said turbomachine in predetermined relationship to said unsteady motion phenomenon for continuously producing from each of said sensors sensor signals related to said unsteady motion phenomenon;
 (b) signal processing means connected to receive said sensor signals from each of said sensors and having at least one channel for continuously processing said sensor signals and continuously outputting control signals; and
 (c) actuator means located in said turbomachine in predetermined relationship to said unsteady motion phenomenon, said actuator means being adapted to be continuously driven by said control signals;
 wherein said signal processing means comprises:
  (i) means for summing sensor signals from each of said sensors in predetermined combinations thereof and weighing said sums to obtain signals representing at least one independent measure of said at least one mode in said at least one channel; and
  (ii) means for modifying said signals representing said at least one independent measure in said at least one channel to obtain said control signals in controlled phase and amplitude relationship to said at least one mode, said actuator means thereby producing outputs effective to change said dynamics of said at least one mode so as to minimize the physical effects of said dynamics on said turbomachine,
 said turbomachine being a turbocompressor, said at least one unsteady motion phenomenon being unsteady fluid flow in said turbocompressor with at least some of said array of sensors being disposed to detect the unsteady fluid flow and produce said sensor signals.

2. The control system as claimed in claim 1, wherein said unsteady fluid flow is associated with surge in said turbocompressor, said actuator means comprising fluid injector means arranged to inject additional fluid into the turbocompressor and valve means arranged to modulate the flow of fluid out of the injector means, said actuator means further comprising drive means connected to said valve means to vary the state thereof, said drive means being driven by said control signals to cause said additional fluid to be injected to counter said surge.

3. The control system as claimed in claim 1, wherein said unsteady fluid flow is associated with surge in said turbocompressor, said actuator means comprising fluid bleed means arranged to extract fluid from the turbocompressor and valve means arranged to modulate the flow of fluid through the bleed means, said actuator means further comprising drive means connected to said valve means to vary the state thereof, said drive means being driven by said control signals to thereby cause said fluid to be extracted to counter the surge.

4. A control system according to claim 1, in which said signal processing means further comprises means for minimizing both the energy level of said at least one mode and the amount of energy consumed by said actuator means.

5. A control system according to claim 1, in which said signal processing means further comprises means for minimizing both the energy level of said at least one mode and a cost of control parameter defined as the performance penalty exacted from said turbomachine in order to supply said actuator means with the power necessary to achieve control of said mode.

6. A control system according to claim 1, in which said signal processing means includes control output converter means, mode filter means in said one channel and means for varying the frequency response of said at least one channel of said mode filter means to match variations in frequency of said at least one mode of said unsteady motion phenomenon and means for varying the amount by which the output of said at least one channel of said mode filter means is amplified and phase shifted in said control output convertor means.

7. A control system according to claim 1, wherein said unsteady fluid flow is surge in said turbocompressor, said actuator means comprising diaphragm means located in said turbocompressor and electrical drive means for driving said diaphragm means to modulate the pressures and velocities of the fluid flow in said turbocompressor, said electrical drive means being driven by said control signals such that said pressures and velocities are modulated to counter said surge.

8. A control system according to claim 1, wherein said unsteady fluid flow is surge in said turbocompressor, said actuator means comprising a plurality of diaphragms angularly spaced around said turbocompressor and a corresponding plurality of electrical drive means, each said electrical drive means driving a corresponding diaphragm to modulate the pressures and velocities of the gas flow in said turbocompressor, each said electrical drive means being driven by said control signals such that said pressures and velocities are modulated to counter said surge.

9. In a gas turbine engine having combustor means, turbine means, turbocompressor means driven by said turbine means, and a fuel system for delivering fuel to said combustor means, a control system for actively controlling surge in said turbocompressor means, comprising:

(a) an array of sensors for sensing unstable fluid flow associated with surge in said turbocompressor and continuously producing from each of said sensor's sensor signals related to said unstable flow;

(b) signal processing means connected to receive said sensor signals from each of said sensors for continuously processing said sensor signals and continuously outputting control signals; and (c) actuator means associated with said fuel system and comprising means for modulating fuel flow to said combustor thereby to modulate the gas flow in said turbocompressor, said actuator means being driven by said control signals, wherein said signal processing means comprises:

(i) means for summing sensor signals from each of said sensors in predetermined combinations thereof and weighing said sums to obtain signals representing at least one independent measure of said unstable flow; and (ii) means for modifying said signals representing said at least one independent measure to obtain said control signals in controlled phase and amplitude relationship to said unstable flow, said actuator means thereby modulating said gas flow in said turbocompressor so as to minimize the physical effects of said unstable flow on said turbomachine.

10. A control system according to claim 9 wherein said actuator means comprises diaphragm means and electrical means for driving said diaphragm means in accordance with said control signals.

11. A control system according to claim 1, said at least one unsteady motion phenomenon being rotating stall in said turbocompressor, said unsteady flow being associated with said rotating stall, said control system being adapted to control at least one mode out of a plurality of modes of said rotating stall wherein said actuator means comprises an array of actuators, and said signal processing means has a plurality of channels, said plurality of channels being at least equal in number to said plurality of modes, said means for modifying said signals representing said at least one independent measure acting to differentially weight said signals representing said at least one independent measure so that said outputs of said actuators are likewise differentially weighted to counter said at least one mode without causing other modes to become unstable.

12. A control system according to claim 11, in which each actuator in said array of actuators comprises a fluid injector means arranged to inject additional fluid into the turbocompressor, valve means arranged to modulate the flow of fluid out of the injector means, and drive means connected to said valve means to vary the state thereof independently of other valve means in said array in accordance with said control signals thereby to cause said additional fluid to be injected to counter said rotating stall.

13. A control system according to claim 11, in which each actuator in said array of actuators comprises a fluid bleed means arranged to extract fluid from the turbocompressor, valve means arranged to modulate the flow of fluid through the bleed means, and drive means connected to said valve means to vary the state thereof independently of other valve means in said array in accordance with said control signals thereby to cause said fluid to be extracted to counter said rotating stall.

14. A control system according to claim 11, in which each actuator in said array of actuators comprises diaphragm means and electrical drive means for driving said diaphragm means independently of other diaphragm means in said array in accordance with said control signal thereby to modulate said pressure and velocity fields to counter said rotating stall.

15. In a turbomachine, a control system for actively controlling the dynamics of at least one mode out of a plurality of modes of at least one unsteady motion phenomenon associated with the blading of said turbomachine, said control system having a control bandwidth which is at least partly coextensive with the bandwidth of said unsteady motion phenomenon and comprising:
   (a) an array of sensors located in said turbomachine in predetermined relationship to said unsteady motion phenomenon for continuously producing from each of said sensors sensor signals related to said unsteady motion phenomenon;
   (b) signal processing means connected to receive said sensor signals from each of said sensors and having a plurality of channels for continuously processing said sensor signals and continuously outputting control signals, said plurality of channels being at least equal in number to said plurality of modes; and
   (c) an array of actuators located in said turbomachine in predetermined relationship to said unsteady motion phenomenon, said actuators being adapted to be continuously driven by said control signals;
   said signal processing means comprising means (V) for obtaining a set of independent measures of said plurality of modes by obtaining a plurality of differentially weighted sums of said sensor signals, means (D) for differentially weighing said set of independent measures of said plurality of modes, and means (U) for differentially weighing said differentially weighted set of independent measures thereby producing said control signals, whereby said actuators have outputs which are weighted with respect to each other thereby to counter said at least one mode without causing said other modes to become unstable;
   wherein each actuator in said array of actuators comprises a fluid injector means arranged to inject additional fluid into a turbocompressor, valve means arranged to modulate the flow of fluid out of the injector means, and drive means connected to said valve means to vary the state thereof independently of other valve means in said array in accordance with said control signals thereby to cause said additional fluid to be injected to counter said unsteady motion phenomenon.

16. In a turbomachine, a control system for actively controlling the dynamics of at least one mode out of a plurality of modes of at least one unsteady motion phenomenon associated with the blading of said turbomachine, said control system having a control bandwidth which is at least partly coextensive with the bandwidth of said unsteady motion phenomenon and comprising:
   (a) an array of sensors located in said turbomachine in predetermined relationship to said unsteady motion phenomenon for continuously producing from each of said sensors sensor signals related to said unsteady motion phenomenon;
   (b) signal processing means connected to receive said sensor signals from each of said sensors and having a plurality of channels for continuously processing said sensor signals and continuously outputting control signals, said plurality of channels being at least equal in number to said plurality of modes; and
   (c) an array of actuators located in said turbomachine in predetermined relationship to said unsteady motion phenomenon, said actuators being adapted to be continuously driven by said control signals;
   said signal processing means comprising means (V) for obtaining a set of independent measures of said plurality of modes by obtaining a plurality of differentially weighted sums of said sensor signals, means (D) for differentially weighing said set of independent measures of said plurality of modes, and means (U) for differentially weighing said differentially weighted set of independent measures thereby producing said control signals, whereby said actuators have outputs which are weighted with respect to each other thereby to counter said at least one mode without causing said other modes to become unstable;
   wherein each actuator in said array of actuators comprises a fluid bleed means arranged to extract fluid from a turbocompressor, valve means arranged to modulate the flow of fluid through the bleed means, and drive means connected to said valve means to vary the state thereof independently of other valve means in said array in accordance with said control signals thereby to cause said fluid to be extracted to counter said unsteady motion phenomenon.

* * * * *

UNITED STATES PATENT AND TRADEMARK OFFICE
CERTIFICATE OF CORRECTION

PATENT NO. : 5,005,353

DATED : April 9, 1991

INVENTOR(S) : ACTON, Elizabeth; CARGILL, Alexander, M.; ROSS, Colin, F.; EATWELL, Graham, P.

It is certified that error appears in the above-identified patent and that said Letters Patent is hereby corrected as shown below:

In Col. 36, line 45, delete "weighing" and insert --weighting--.

In Col. 37, line 67, delete "sensor's" and insert --sensors--.

In Col. 38, line 13, delete "weighing" and insert --weighting--.

In Col. 39, lines 32 and 34, delete "weighing" and insert --weighting--.

In Col. 40, lines 30 and 32, delete "weighing" and insert --weighting--.

Signed and Sealed this

Sixth Day of October, 1992

Attest:

DOUGLAS B. COMER

*Attesting Officer*    *Acting Commissioner of Patents and Trademarks*